US005233521A

United States Patent [19]

Kimpara

[11] Patent Number: 5,233,521

[45] Date of Patent: Aug. 3, 1993

[54] AUTOMATIC PERFORMANCE APPARATUS WITH DISPLAY SHOWING PROGRESS OF TUNE

[75] Inventor: Mamoru Kimpara, Hamamatsu, Japan

[73] Assignee: Yamaha Corporation, Hamamatsu, Japan

[21] Appl. No.: 869,858

[22] Filed: Apr. 16, 1992

Related U.S. Application Data

[63] Continuation of Ser. No. 296,510, Jan. 2, 1989, abandoned.

[30] Foreign Application Priority Data

Jan. 13, 1988 [JP] Japan .................................. 63-5377
Jan. 13, 1988 [JP] Japan .................................. 63-5378

[51] Int. Cl.[5] ........................ G06F 15/20; G10F 1/00; G10H 1/00

[52] U.S. Cl. ........................................................ 84/609

[58] Field of Search .................. 364/419; 84/601, 602, 84/609

[56] References Cited

U.S. PATENT DOCUMENTS 4,464,731 8/1984 Nishimura ........................... 364/900
4,474,098 10/1984 Pepersack et al. .................... 84/609
4,560,362 1/1986 Kikumoto ............................ 84/609
4,622,879 11/1986 Matsubara ............................ 84/609
4,744,281 5/1988 Isozaki ................................ 84/602
4,768,413 9/1988 Fujimori .............................. 84/601

FOREIGN PATENT DOCUMENTS 62-2096 1/1987 Japan .
62-175796 1/1987 Japan .

OTHER PUBLICATIONS

"Visual Composer: Users Guide" AdLib Personal Computer Music System, 1987.

*Primary Examiner*—Roy N. Envall, Jr.
*Assistant Examiner*—David Huntley
*Attorney, Agent, or Firm*—Graham & James

[57] ABSTRACT

An automatic performance apparatus includes a memory for storing performance data which is generated by an external unit such as an electronic musical instrument having a keyboard. The apparatus includes a measuring unit for measuring the elapsed time of a progressive tune, and a ratio computing unit for computing a time ratio between the measured elapsed time and the total time required to read out all the performance data. This time ratio is displayed to the user. Further, a jump control unit employs the time ratio to determine a jump amount in a fast-forward and fast-rewind mode.

4 Claims, 18 Drawing Sheets

AUTOMATIC PERFORMANCE APPARATUS WITH DISPLAY SHOWING PROGRESS OF TUNE

This is a continuation of copending application Ser. No. 07/296,510, filed on Jan. 2, 1989, now abandoned.

BACKGROUND OF THE INVENTION

1. Field of the Invention

The present invention relates to an automatic performance apparatus, and more particularly to an automatic performance apparatus which plays an automatic performance based on performance data stored in a memory.

2. Prior Art

As a first conventional automatic performance apparatus, the apparatus as disclosed in Japanese Utility Model Laid-Open Publication No. 62-2096 has been well known. This first apparatus displays used capacity of memory by address number.

This first apparatus is advantageous in recording the performance data in the memory because it can visually display remaining capacity of memory. However, since quantity of performance data stored in the memory depends on a kind of musical tune, it is impossible to catch a progressing position of tune when the performance data are read from the memory.

Meanwhile, a second conventional automatic performance apparatus as disclosed in Japanese Patent Laid-Open Publication No. 62-175796 provides a search controller for changing the progressing position of automatic performance to the desirable position. When the search controller is revolved in left or right direction, an address count value designates a reading address of memory by the speed corresponding to its revolving position (i.e., by the speed which is faster than the normal performance speed). By incrementing or decrementing such address count value, musical tones are sequentially generated by a rate which is faster than the normal rate, so that the reading positions of performance data are changed.

In this second conventional automatic performance apparatus, the speed for incrementing or decrementing the address count value is set at the speed by which the musical tones are sequentially generated. For this reason, the second conventional automatic performance apparatus is disadvantageous in that it is impossible to change the reading position of performance data to the desirable position within a short time.

On the contrary, it is possible to set the speed for incrementing or decrementing the address count value at the speed by which the musical tones cannot be sequentially generated, in other words, a system clock speed of digital system, a processing speed of microcomputer or the like. In such case, the reading position of performance data is also sequentially changed as long as the search controller is revolved, so that the change in the reading position of performance data becomes too large as compared to the case where reading position of performance data is changed in synchronism with the revolving speed of the search controller. Therefore, as similar to the foregoing case, it is difficult to change the reading position of performance data to the desirable position.

SUMMARY OF THE INVENTION

It is accordingly a primary object of the present invention to provide an automatic performance apparatus which can display the progressing state of tune when performance data are read from the memory.

It is another object of the present invention to provide an automatic performance apparatus which can change a reading position of performance data stored in the memory in response to an operation of a manually operable member.

In a first aspect of the invention, there is provided an automatic performance apparatus comprising:

(a) memory means for storing a plurality of performance data in accordance with progress of tune, the performance data concerning performance of a musical instrument;

(b) reading means for sequentially reading the plurality of performance data from the memory means by a predetermined tempo;

(c) measuring means for measuring a progressing position of tune in accordance with the progress of tune when the reading means reads out the performance data;

(d) rate computing means for computing a time rate between measured progressing position of tune and whole length of tune concerning the performance data stored in the memory means; and (e) display means for displaying the time rate computed by the rate computing means.

In a second aspect of the invention, there is provided an automatic performance apparatus comprising:

(a) memory means for storing a plurality of performance data in accordance with progress of tune, the performance data including performance event data and relative time data, the performance event data being used for controlling generation of a musical tone the relative time data representing reading interval of each performance data;

(b) means for generating a tempo clock signal by a rate corresponding to a progressing speed of tune;

(c) reading means for sequentially reading the performance event data from the memory means by a time interval corresponding to the relative time data, the time interval being obtained by counting number of tempo clocks;

(d) measuring means for measuring a lapse of time in correspondence with the number of tempo clocks when the reading means reads out the performance event data;

(e) rate (ratio) computing means for computing a time rate (ratio) between measured lapse of time and whole time corresponding to the number of tempo clocks, the whole time indicating a period which is necessary for reading all of the performance event data from the memory means; and (f) display means for displaying the time rate computed by the rate computing means.

In a third aspect of the invention, there is provided an automatic performance apparatus comprising:

(a) memory means for respectively storing a plurality of performance data in plural addresses in accordance with progress of tune, the performance data concerning performance of a musical instrument;

(b) reading means for generating an address signal to thereby sequentially read out the performance data stored in an address designated by the address signal, the address signal indicating an address value which is incremented by a predetermined tempo;

(c) rate computing means for computing a rate between a first address value and a second address value, the first address value being generated when the reading means reads out the performance data, the second address value indicating an address in which last performance data are stored in the memory means; and (d) display means for displaying the rate computed by the rate computing means.

In a fourth aspect of the invention, there is provided an automatic performance apparatus comprising:

(a) memory means for storing performance data in accordance with progress of tune, the performance data concerning performance of a musical instrument;

(b) reading means for generating an address signal by which certain addresses in the memory means are sequentially designated, the reading means thereby sequentially reading the performance data from the certain addresses, the address signal having an address value which is incremented by a speed corresponding to a predetermined tempo;

(c) at least one manually operable member; and (d) jump control means for controlling the reading means in response to operation of the manually operable member so that the address value is jumped by a predetermined jump amount in a progressing direction or its reverse direction of the performance of the musical instrument by every operation of the manually operable member.

In a fifth aspect of the invention, there is provided an automatic performance apparatus comprising:

(a) memory means for storing performance data in accordance with progress of tune, the performance data concerning performance of a musical instrument;

(b) reading means for generating an address signal by which certain addresses in the memory means are sequentially designated, the reading means thereby sequentially reading the performance data from the certain addresses, the address signal having an address value which is incremented by a speed corresponding to a predetermined tempo;

(c) first and second manually operable members;

(d) speed control means for controlling the reading means in response to operation of the first manually operable member to thereby increase an incrementing speed of the address value during the operation of the first manually operable member; and (e) jump control means for controlling the reading means in response to simultaneous operations of the first and second manually operable members so that the address value is jumped by a predetermined jump amount in a progressing direction of the tune at every time when the first and second manually operable members are simultaneously operated.

In a sixth aspect of the invention, there is provided an automatic performance apparatus comprising:

(a) memory means for storing performance data in accordance with progress of tune, the performance data concerning performance of a musical instrument;

(b) reading means for generating an address signal by which certain addresses in the memory means are sequentially designated, the reading means thereby sequentially reading the performance data from the certain addresses, the address signal having an address value which is incremented by a speed corresponding to a predetermined tempo;

(c) first and second manually operable members;

(d) means for controlling the reading means in response to operation of the first manually operable member to thereby increase an incrementing speed of the address value during the operation of the first manually operable member, the means also incrementing the address value in a direction reverse to a progressing direction of the tune; and (e) jump control means for controlling the reading means in response to simultaneous operations of the first and second manually operable members so that the address value is jumped by a predetermined jump amount in the direction reverse to the progressing direction of the tune at every time when the first and second manually operable members are simultaneously operated.

In a seventh aspect of the invention, there is provided an automatic performance apparatus comprising:

(a) receiver means for receiving performance data from an external device;

(b) memory means capable of storing the performance data;

(c) switches to which several predetermined functions are respectively assigned;

(d) control means for controlling reading timings and writing timings of the performance data in response to operations of the switches;

(e) display means for displaying a progressing state of tune when the performance data are read from the memory means; and (f) transmitter means capable of transmitting read performance data to the external device.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF A PREFERRED EMBODIMENT

[A] Diagrammatic Constitution of Embodiment

Figure 1:
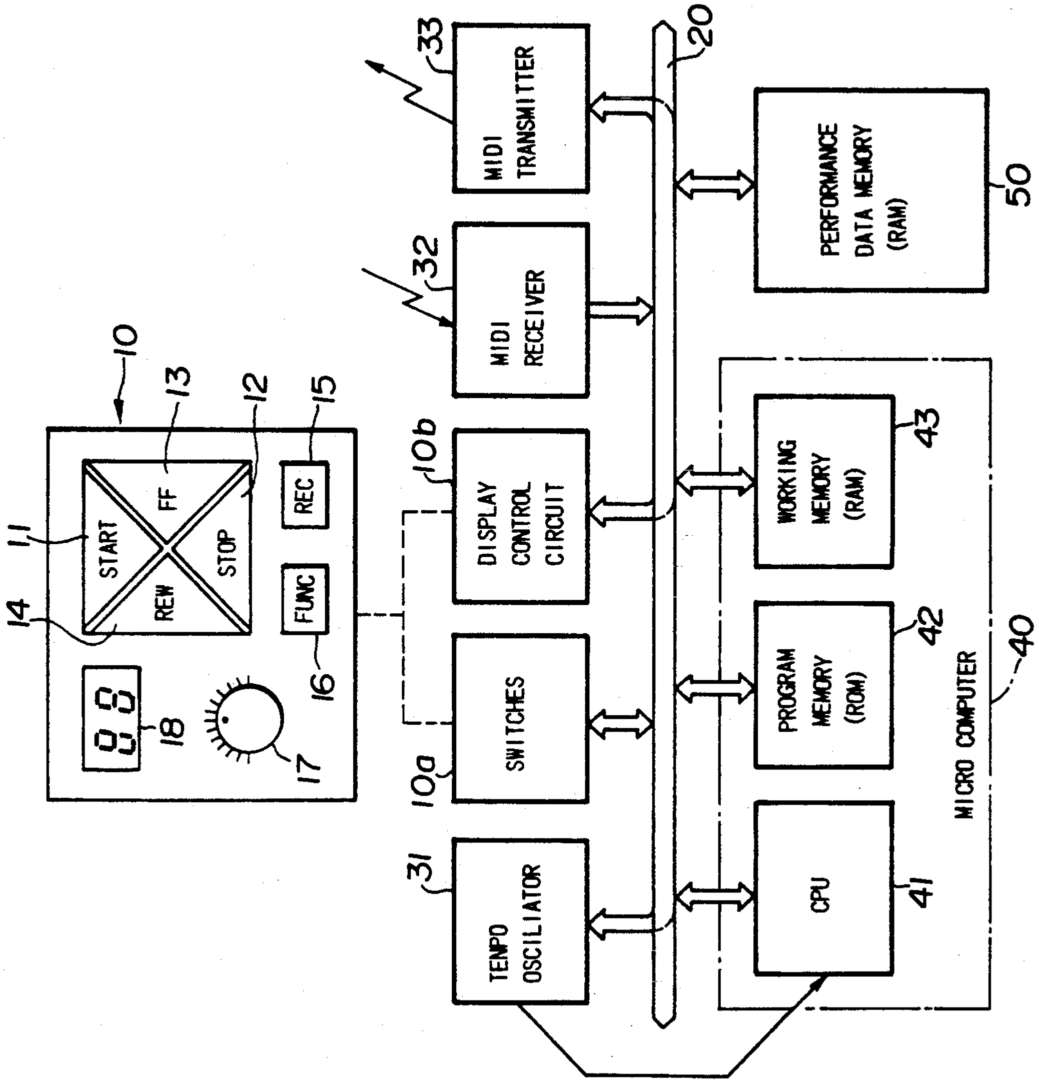
FIG. 1 is a block diagram showing diagrammatical constitution of the automatic performance apparatus according to an embodiment of the present invention.

Referring now to the drawings wherein like reference characters designate like or corresponding parts throughout several views, FIG. 1 is a block diagram showing the constitution of the automatic performance apparatus according to an embodiment of the present invention. This automatic performance apparatus provides a console panel 10 which includes a START switch 11, a STOP switch 12, a FF (fast feed) switch 13, a REW (rewind) switch 14, a REC (recording) switch 15, a FUNC (function) switch 16 and a tempo controller 17. Each of these switches 11 to 16 designates each operation mode of the automatic performance, while the tempo controller 17 sets the tempo of automatic performance. The operation of each switch is detected by each corresponding switch provided in switches 10*a*, and the operation of the tempo controller 17 is detected by a digital position sensor which is also provided in the switches 10a. Each switch and digital position sensor within the switches 10a are connected to a bus 20. In addition, the console panel 10 further provides a display unit 18 which displays the progressing position of automatic performance by a double-digit number ("0" to "99"). This display unit 18 is controlled by a display control circuit 10b connected to the bus 20.

Further, the bus 20 is connected with a tempo oscillator 31, a musical instrument digital interface (MIDI) receiver 32 and a MIDI transmitter 33. The tempo oscillator 31 is constituted by a variable oscillator by which a tempo clock signal is generated by a cycle (or rate) corresponding to the set tempo. The MIDI receiver 32 is an interface circuit which inputs the performance data represented by a MIDI chord. This MIDI receiver 32 can be connected with an electronic musical instrument, a performance operation unit and other automatic performance apparatus (not shown), wherein the performance operation unit is the unit which does not provide a musical tone signal generating unit but which can output the performance data generated from a keyboard. The MIDI transmitter 33 is an interface circuit which outputs the performance data represented by the MIDI chord. This MIDI transmitter 33 can be connected with the electronic musical instrument, tone source unit and other automatic performance apparatus, wherein the tone source unit is the unit which does not provide performance operation means such as the keyboard but which can generate the musical tone signal.

Furthermore, the bus 20 is connected with a microcomputer 40 and a performance data memory 50. This microcomputer 40 includes a central processing unit (CPU) 41, a program memory 42 and a working memory 43. The CPU 41 executes a "main program" corresponding to the flowchart shown in FIGS. 2A and 2B by the timing when a power switch (not shown) is turned on. In addition, the CPU 41 interruptedly executes a "tempo clock interrupt program" corresponding to the flowchart shown in FIGS. 3A and 3B in response to the tempo clock signal generated from the tempo oscillator 31. The program memory 42 is constituted by a read only memory (ROM) which stores the "main program" and "tempo clock interrupt program" and which also stores subprograms as shown in FIGS. 4 to 14 corresponding to subroutines of each program. The working memory 43 is constituted by a random access memory (RAM) which temporarily stores variable data necessary for executing each program. The variable data include the following data:

Tempo clock TCL which indicates the progress of automatic performance apparatus by incrementing its value by one at every time when the tempo clock signal is arrived;

Pointer PNT which indicates the address of performance data memory 50 ("0" to "DTEND");

Tempo data TMP which indicates the tempo speed of automatic performance;

Present tempo clock number NTM which indicates the presently accumulated value of tempo clock numbers;

Total tempo clock number TTM which indicates the sum of tempo clock numbers in one tune;

Time data DUR which indicates a period between present event data and next event data to be generated;

Display data DSP which indicates the display value of the display unit 18;

Jump data PC10 which indicates the progressing position at the destination address in a jump mode;

Mode data MODE which indicates one of five modes set in the present automatic performance apparatus (see Table 1); and Submode data SUBMOD which indicates one of five submodes set in the present automatic performance apparatus (see Table 2).

TABLE 1

| MODE | Mode Name | Function |
|---|---|---|
| 0 | STOP | Stop of Automatic Performance |
| 1 | PLAY | Play of Automatic Performance |
| 2 | PLAY STANDBY | Standby in Reproduction of Automatic Performance |
| 3 | RECORD | Recording of Automatic Performance |
| 4 | RECORD STANDBY | Standby in Recording of Automatic Performance |

TABLE 2

| SUBMOD | Submode Name | Function |
|---|---|---|
| 0 | NORMAL | — |
| 1 | REWIND | Sequential Rewinding |
| 2 | JUMP REWIND | Rewinding with Jumping by Certain Amount of Data |
| 3 | FAST FEED | Sequential Fast Feeding |
| 4 | Jump Fast Feed | Fast Feeding with Jumping by Certain Amount of Data |

The performance data memory 50 is constituted by the RAM which has storing areas corresponding to its addresses "0" to "DTEND". This performance data memory 50 stores several kinds of performance data DATA including the following data as indicated by data formats shown in FIG. 15 and the other data concerning the tone color, tone volume, musical effect and the like.

Key-on data constituted by data of three bytes . . . . Its first byte data include an identification code "$9X_H$". The most significant bits (MSB) of second and third byte data take the same value "0". Lower seven bits of second byte data represent a key code KC, while lower seven bits of third byte data represent a key-depression touch data KT.

Key-off data constituted by data of three bytes . . . . Its first byte data include an identification code "$8X_H$". The most significant bits of second and third byte data take the same value "0". Lower seven bits of second byte data represent the key code KC, while those of third byte data represent the key-depression touch data KT.

Time data constituted by data of two bytes . . . . Its first byte data include an identification code "$F2_H$". The MSB of second byte data takes the value "0", while lower seven bits thereof represent a time value TIME.

Long time data constituted by data of three bytes . . . . Its first byte data include an identification code "$F3_H$". The MSBs of second and third byte data take the same value "0". The time value TIME of this long time data is represented by fourteen bits. Lower seven bits of second byte data are set identical to upper seven bits of this time value TIME, while lower seven bits of third byte data are set identical to lower seven bits of this time value TIME (i.e., TIME').

Tune start data which are constituted by data of one byte representing an identification code "$F0_H$".

Non-operation data which are constituted by data of one byte representing an identification code "$F9_H$".

Tune end data which are constituted by data of one byte representing an identification code "$FF_H$".

As the working memory 43 and performance data memory 50, it is possible to use the RAM in general use. However, of course, it is possible to use the RAM with battery back-up or non-volatile RAM.

Next, description will be given with respect to the operation of the automatic performance apparatus having the above-mentioned constitution. When the power switch is turned on, the CPU 41 starts to execute the "main program" in a step 100 shown in FIG. 2A. In a next step 101, the CPU 41 works together with the display control circuit 10*b* to thereby control and initialize the display unit 18 such that the display unit 18 will display an image "--". In addition, each value of several kinds of variable data stored in the working memory 43 is initialized to "0", and then the CPU 41 will continuously execute circulating processes consisting of steps 102 to 110. In such circulating processes, processes corresponding to the operations of switches 11 to 15 are respectively executed in the steps 102 to 108, while it is detected that the performance data arrives at the MIDI receiver 32 in the step 109. Further, in the step 110, the oscillating frequency of tempo oscillator 31 is controlled in response to the operating position of tempo controller 17, and the value of tempo data TMP is also set in response to such operating position. In the above-mentioned circulating processes, when the tempo oscillator 31 outputs the tempo clock signal, the CPU 41 starts to execute the "tempo interrupt program".

[B] Operation of Embodiment

Figure 16:
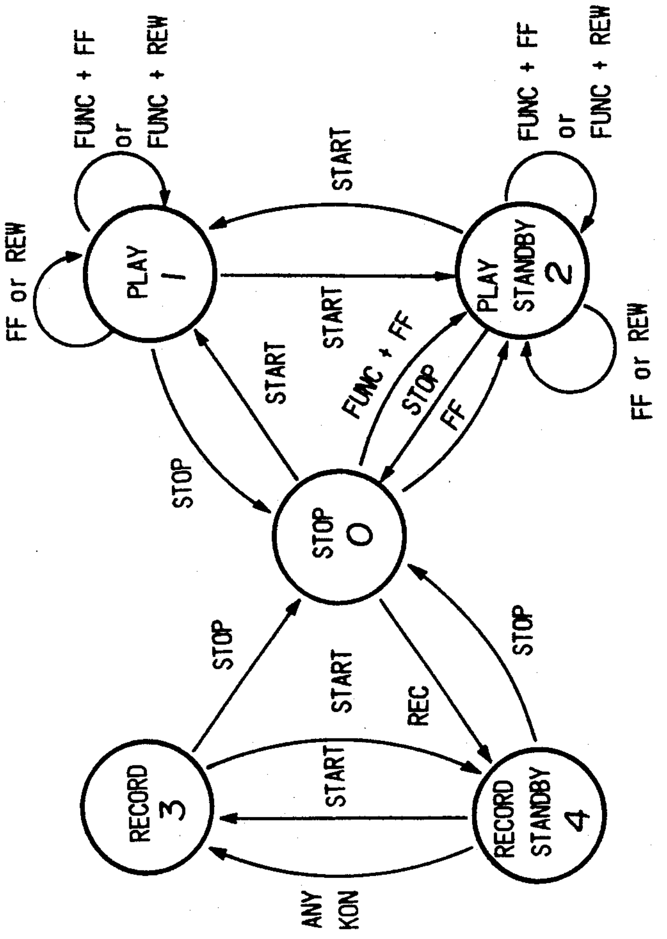
FIG. 16 is a state transition diagram of the automatic performance apparatus shown in FIG. 1.

Hereinafter, description will be given with process operations corresponding to the operations of switches 11 to 16. For convenience sake, description will be given by dividing these process operations into (1) PERFORMANCE RECORDING OPERATION, (2) PERFORMANCE REPRODUCING OPERATION, (3) FAST FEEDING OPERATION and (4) REWINDING OPERATION. Incidentally, the present automatic performance apparatus is basically in the state of stop mode. As shown in FIG. 16, in the stop mode, the value of mode data MODE is set to "0" in the step 101 shown in FIG. 2A. In this stop mode, even if the "tempo interrupt program" is executed by the timing of tempo clock signal, judgement result of a step 201 (shown in FIG. 3A) turns to "YES" so that the execution of "tempo interrupt program" will be ended in a step 202 (shown in FIG. 3B) without executing its substantial processes.

(1) Performance Recording Operation

Figure 2A:
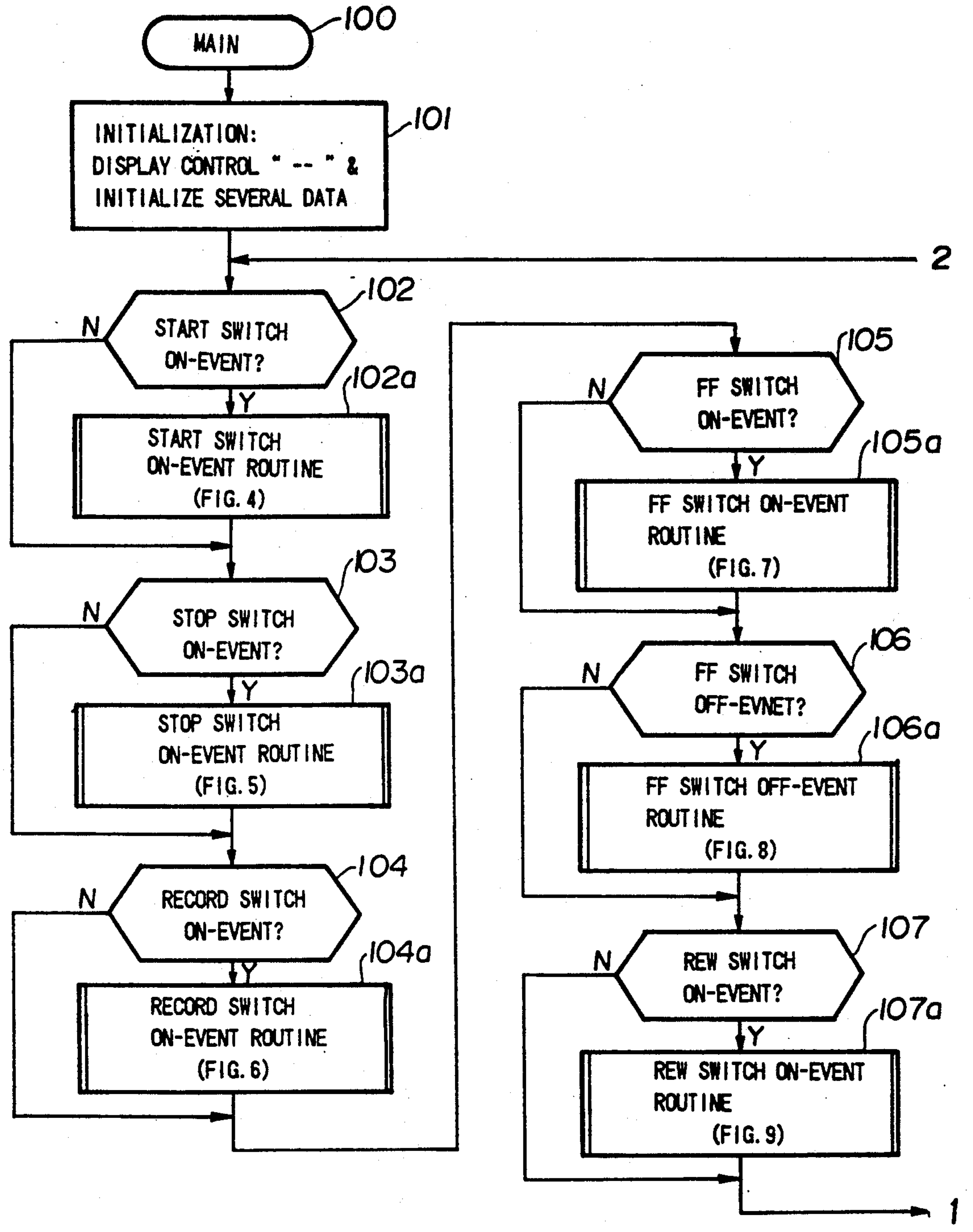
FIGS. 2A–2B, 3A–3B, 4–10, 11A–11B, 12A–12B, 13A–13B and 14 are flowcharts showing examples of programs which are executed by a microcomputer shown in FIG. 1.
Figure 2B:
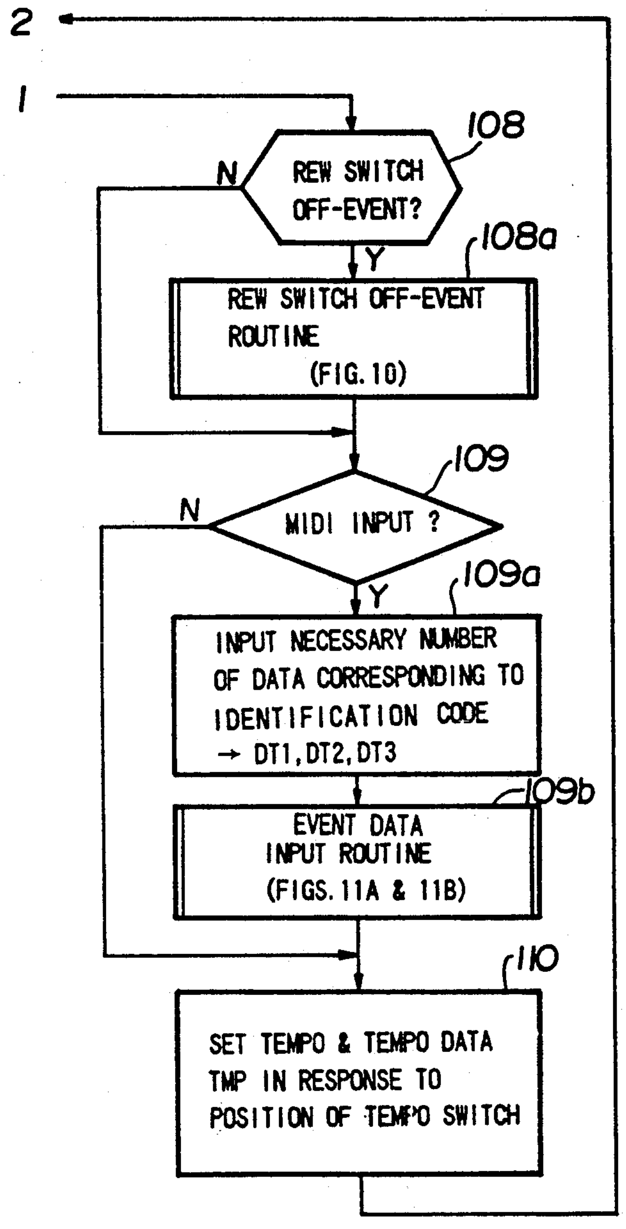
Figure 3A:
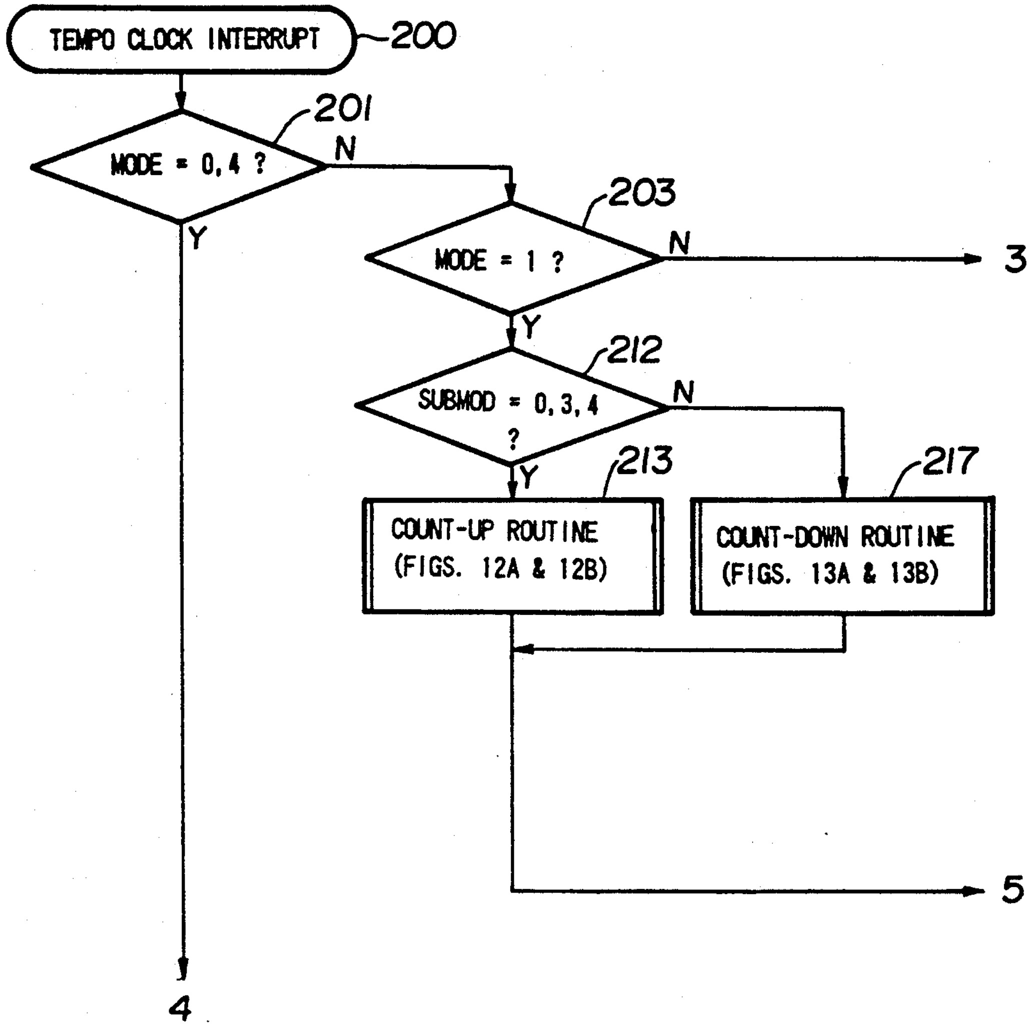

When the REC switch 15 is operated in the above-mentioned stop mode, judgement result in the step 104 turns to "YES" (i.e., the CPU 41 detects the on-event of REC switch 15) while the CPU 41 is executing the circulating processes consisting of the steps 102 to 110 (shown in FIGS. 2A and 2B). Then, in a step 104*a*, the CPU 41 executes a "REC switch on-event routine" (see FIG. 6) which is started from a step 360. Since the value of mode data MODE is set to "0", judgement result of a step 361 turns to "YES". Hence, the value "4" is set as the mode data MODE in a step 362, and then the display control circuit 10*b* is controlled such that the display unit 18 displays the image "00" in a step 363. Thereafter, this routine is ended in a step 364. Thus, the mode of automatic performance apparatus is set to the record standby mode as shown in FIG. 16. Incidentally, in any mode other than the stop mode (where the value of mode data MODE equals to "0"), even if the REC switch 15 is operated, the judgement result of the step 361 turns to "NO" so that the mode of automatic performance apparatus will not be changed to the record standby mode.

Next, when the START switch 11 is operated or the performance data (i.e., the key-on data from the keyboard etc.) are transmitted to the MIDI receiver 32 in this record standby mode, the present mode is changed to the record mode as shown in FIG. 16.

More specifically, when the START switch 11 is operated while the CPU 41 is executing the circulating processes consisting of the steps 102 to 110, the judgement result of the step 102 turns to "YES" (i.e., the on-event of the START switch 11 is detected), so that the CPU 41 starts to execute a "START switch on-event routine" (see FIG. 4) in the step 102*a*. This routine is started from a step 300, and then processes of steps 302 to 304 are executed based on judgement result of a step 301. Thereafter, this routine is ended in a step 305. In this case, the present mode can be set to the record mode by setting the value of mode data MODE to "3" in the step 302. In the step 303, tune start data "$F0_H$" are written in the address designated by the pointer PNT(=0) within the performance data memory 50 as the performance data DATA(PNT). Then, in the step 304, the value of pointer PNT is incremented by "1". In such state, when the tempo oscillator 31 outputs the tempo clock signal, a "tempo clock interrupt program" (see FIGS. 3A and 3B) is executed. In this case, the value of mode data MODE has been already set to "3", so that judgement results of steps 201, 203 and 204 are all turned to "NO". Therefore, processes of steps 205 to 211 (which will be described later in detail) are executed so that the tempo clock TCL is incremented by "1" at every time when this tempo clock interrupt program is executed.

Meanwhile, when the MIDI receiver 32 receives the performance data while the CPU 41 is executing the circulating processes, the judgement result of the step 109 turns to "YES" (i.e., the MIDI input is detected). Then, the CPU 41 inputs the necessary number ("1" to "3") of performance data inputted to the MIDI receiver 32 as input data DT1, DT2 and DT3 in response to the identification code thereof. Thereafter, the CPU 41 executes an "event data input routine" (see FIGS. 11A and 11B) in the step 109*b*. This routine is started from a step 600, and then the mode data MODE are judged in steps 601 and 602. If the present mode is at the record standby mode and the value of mode data MODE is equal to "4", the judgement result of the step 601 turns to "NO" but the next judgement result of the step 602 turns to "YES". Then, similar to the steps 302 to 304 described before, the value "3" is set to the mode data MODE in a step 603; the tune start data "$F0_H$" are written in the address designated by the pointer PNT(=0) in the performance data memory 50 as the performance data DATA(PNT) in a step 604; and the value of pointer PNT is incremented by "1" in a step 605. Thus, similar to the case where the START switch 11 is operated, the performance data memory 50 prepares to write in the performance data and the tempo clock TCL is simultaneously started to be incremented in the case where the performance data are transmitted to the MIDI receiver 32 in the record standby mode.

As described above, in the case where the performance data arrives in the record standby mode, the processes of steps 601 to 605 are executed. Or, in the case where the new performance data arrives after the present mode is changed to the record mode due to the operation of START switch 11 or the arrival of preceding performance data, the judgement result of the step 601 turns to "YES" (i.e., it is judged that the value of mode data MODE is equal to "3"). Thereafter, the arrived performance data and time data are written into the performance data memory 50 in processes after a step 606. Incidentally, if the mode data MODE do not take the values "3" and "4" in such "event data input routine", the judgement results of the steps 601 and 602 both turn to "NO". In this case, the processing proceeds to a step 607 shown in FIG. 11B so that the execution of this routine is ended without substantially executing any processes of this routine.

The tempo clock TCL is incremented by "1" at every time when the "tempo clock interrupt program" is executed. In the step 606, it is judged whether such tempo clock TCL is equal to or smaller than a value "$7F_H$" or not. In other words, it is judged whether such tempo clock TCL can be expressed by data of seven bits or not. If the tempo clock TCL is equal to or smaller than the value "$7F_H$", the judgement result of this step 606 turns to "YES" so that the processing proceeds to a step 608. In this step 608, time identification data "$F2_H$" are written at the address designated by the pointer value PNT in the performance data memory 50 as the performance data DATA(PNT), while the tempo clock TCL is written at the address designated by the pointer value PNT+1 as the performance data DATA(PNT+1). Thereafter, the pointer value PNT is increased by "2" in a step 609. On the contrary, if the tempo clock TCL is larger than the value "$7F_H$", the judgement result of step 606 turns to "NO" so that the processing proceeds to a step 610. In this step 610, time data TM1 are set in the upper seven bits of tempo clock TCL, while other time data TM2 are set in the lower seven bits of tempo clock TCL. Thereafter, the processing proceeds to a step 611 wherein long time identification data "$F3_H$" are written at the address designated by the pointer value PNT as the performance data DATA(PNT); the time data TM1 are written at the address designated by the pointer value PNT+1 as the performance data DATA(PNT+1); and the time data TM2 are written at the address designated by the pointer value PNT+2 as the performance data DATA(PNT+2). Then, the processing proceeds to a next step 612 wherein the pointer value PNT is increased by "3".

After executing the process in the step 609 or 612, the processing proceeds to a step 613 (shown in FIG. 11B) wherein the tempo clock number NTM is renewed by adding the tempo clock TCL to the present tempo clock number NTM. Next, in a step 614, the tempo clock TCL is initialized to "0", and then the CPU 41 will execute a "data writing routine" (see FIG. 14). In such "data writing routine", the performance data DT1, DT2 and DT3 which are inputted by the process of step 109*a* (shown in FIG. 2B) are written into the performance data memory 50. Such routine is started from a step 800, and then the kinds of inputted performance data DT1, DT2 and DT3 are judged by the processes of succeeding steps 801 to 803. In this case, the performance data can be classified into the key-on data, key-off data or other performance data concerning the tone color, tone volume and the like. For example, if each of the performance data DT1 to DT3 is the key-on data or key-off data, this performance data DT1 take the value "$9X_H$" or "$8X_H$" so that the judgement result of this step 801 turns to "YES". In this case, the processing proceeds to a step 804 wherein the inputted performance data DT1, DT2 and DT3 are respectively written at the addresses designated by the pointer values PNT PNT+1 and PNT+2 as the performance data DATA(PNT), DATA(PNT+1) and DATA(PNT+2). Then, the pointer PNT is increased by "3" in a step 805. Thereafter, the execution of the "data writing routine" is ended in a next step 806.

On the other hand, if each of the performance data DT1 to DT3 is the other performance data concerning the tone color, tone volume and the like, the performance data do not take any one of the values "$9X_H$", "$8X_H$", "$F9_H$" and "$FF_H$" at all so that the judgement results of steps 801 to 803 all turn to "NO" and the processing proceeds to a step 807. In this step 807, the inputted performance data DT1, DT2 and DT3 are respectively written at the addresses designated by the pointer values PNT, PNT+1 and PNT+2 as the performance data DATA(PNT), DATA(PNT+1) and DATA(PNT+2), and the pointer PNT is also increased by "3". Thereafter, the processing proceeds to the step 806, whereby the execution of the "data writing routine" will be ended. Incidentally, if the other performance data are not the data of three bytes but the data of one or two bytes, the number of performance data to be written in is one or two, and the increase of the pointer PNT is set to "1" or "2".

As described above, the tempo clock TCL is used as interval data between the performance data. Hence, at every time when the performance data are received by the MIDI receiver 32, the performance data memory 50 sequentially stores the tempo clock TCL indicative of the interval data in addition to the performance data in the execution of the "event data input program" (shown in FIGS. 11A and 11B).

Meanwhile, at every time when the tempo oscillator 31 generates the tempo clock signal while the performance data are written into the memory 50, the "tempo clock interrupt program" (shown in FIGS. 3A and 3B) is executed. Then, after executing the processes of the steps 201, 203 and 204, the tempo clock TCL is incremented by "1" in the step 205. Normally, when the MIDI receiver 32 receives the performance data, the tempo clock TCL is initialized to "0" in the step 614 (shown in FIG. 11B). For this reason, the tempo clock TCL which is constituted by the data of two bytes (strictly speaking, data of fourteen bits) will not be overflowed. Therefore, after executing the step 205, the judgement result of the next step 206 is "NO". In other words, it is judged that the tempo clock TCL is not larger than a value "$4000_H$" corresponding to the data of fourteen bits. As a result, the execution of the "tempo clock interrupt program" is ended in the step 202.

However, in the case where the performance data are not transmitted to the MIDI receiver 32 for a long time, the tempo clock TCL becomes larger than the value "$4000_H$" so that the judgement result of step 206 turns to "YES". Then, the progressing proceeds to the step 207 wherein the tempo clock TCL is set to a value "$3FFF_H$" corresponding to the maximum value which can be expressed by the data of fourteen bits. In this case, the value of mode data MODE has been already set to "3" (record mode). Therefore, the judgement result of the next step 208 turns to "YES" so that the processing proceeds to the step 209 wherein the value "$F9_H$" (i.e., non-operation data) is set as the value of inputted performance data DT1. Then, the "event data input routine" (shown in FIGS. 11A and 11B) is executed in the step 210.

In the above case, the value of mode data MODE is set to "3" and the tempo clock TCL is larger than the value "$7F_H$" indicating the maximum value which can be expressed by the data of seven bits. Therefore, after executing the steps 610 to 614 (wherein the tempo clock TCL is written in as the performance data; the present tempo clock number NTM is renewed; and the tempo clock TCL is initialized to "0"), the CPU 41 executes the "data writing routine" (shown in FIG. 14) in the step 615. In this case, the value of inputted performance data DT1 is set to "$F9_H$" in the step 209 (shown in FIG. 3B) so that the judgement result of step 801 turns to "NO" but the judgement result of the next step 802 turns to "YES". Hence, in a step 808, the inputted performance data DT1 (i.e., the value "$F9_H$") are written at the address designated by the pointer PNT as the performance data DATA(PNT). Then, the pointer PNT is incremented by "1" in a step 809. Thereafter, the processing proceeds to the step 806, whereby the execution of "data writing routine" is ended. As a result, the maximum value of tempo clock TCL plus the identification code are both written into the performance data memory 50, and the non-operation data are also simultaneously written in this memory 50. Thus, the time data which cannot be expressed by the data of fourteen bits are substantially extended.

After executing the step 210 (shown in FIG. 3B), the processing proceeds to the step 211 wherein the tempo clock TCL is initialized to "0". Then, the "tempo clock interrupt program" is executed in the step 202. Incidentally, in the case where the present automatic performance apparatus is set in the record standby mode (i.e., the value of mode data MODE is equal to "4"), the judgement result of step 201 (shown in FIG. 3A) turns to "NO" even if the execution of the "tempo clock interrupt program" is started by the tempo clock signal. Hence, the execution of this program will be ended in the step 202 without substantially executing its processes.

Next, description will be given with respect to the display operation of display unit 18 when the performance data are written in. While the "event data input routine" (shown in FIGS. 11A and 11B) is executed, the CPU 41 executes the calculation of following formula (1) based on the renewed pointer value PNT and the last address value DTEND of the performance data memory 50 (which represents the capacity of the memory 50) in a step 616.

$$DSP=INT\{(1-PNT/DTEND)*100\} \quad (1)$$

In this formula (1), the function INT(x) means the integral portion of "x". Due to this formula (1), the display data DSP can indicate the remaining capacity of the performance data memory 50 by percentage. After executing the step 616, the processing proceeds to a step 617 wherein it is judged whether the pointer value PNT has reached the last address DTEND or not. If the pointer value PNT has not reached the last address DTEND yet, the judgement result of this step 617 turns to "NO" so that the processing proceeds to a step 618. In the step 618, the CPU 41 cooperates with the display control circuit 10b to thereby control the display unit 18 to display the value corresponding to the display data DSP. Thus, in the record mode and record standby mode (i.e., the value of mode data MODE equals to "3" or "4"), the display unit 18 will display the remaining capacity of the performance data memory 50 corresponding to its address value.

Figure 5:
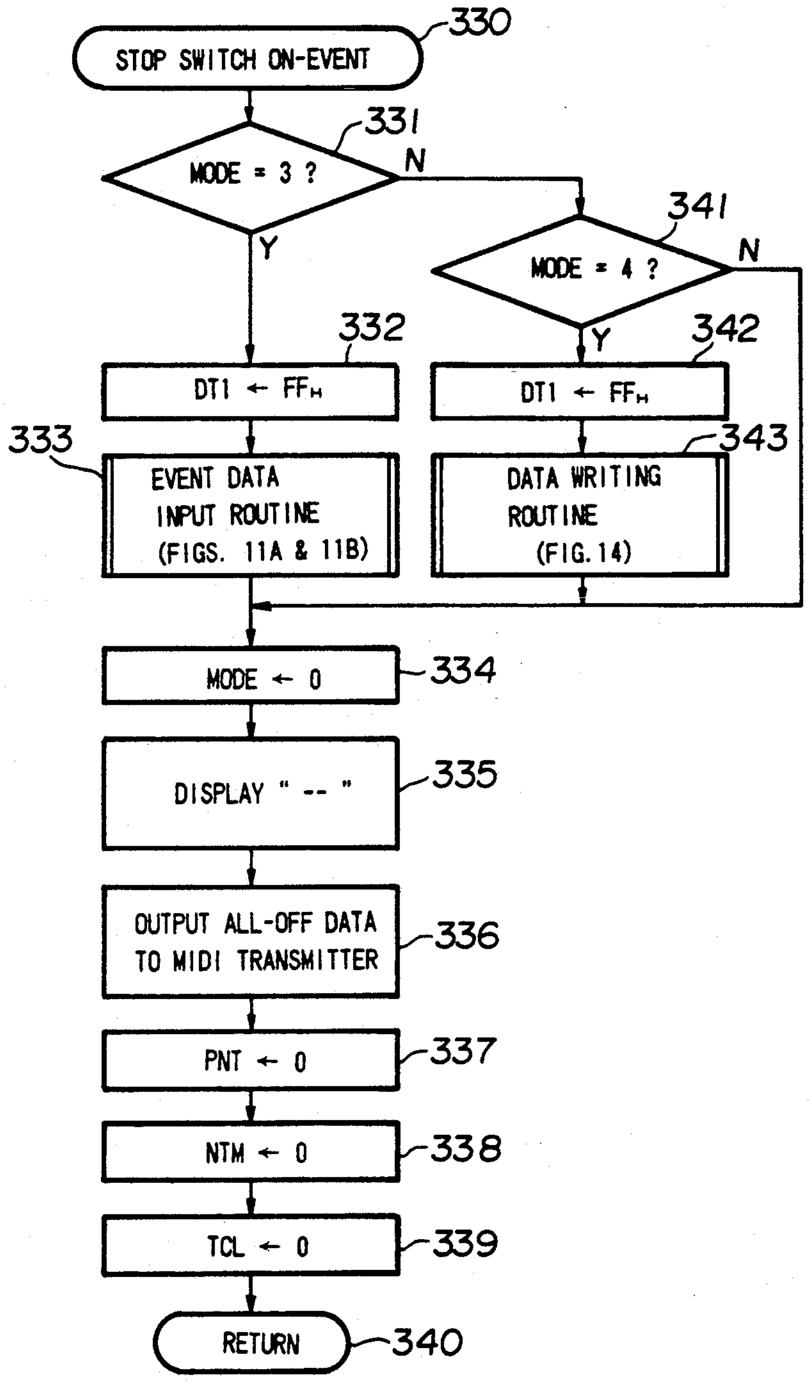
Figure 8:
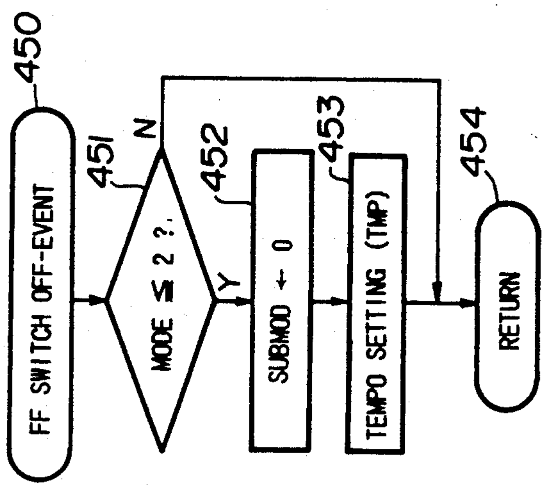
Figure 6:
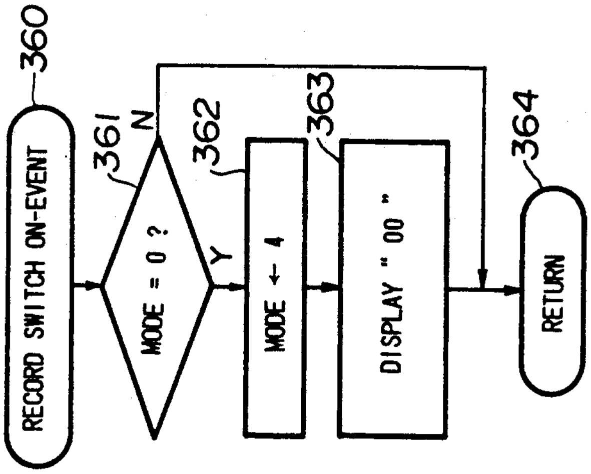
Figure 7:
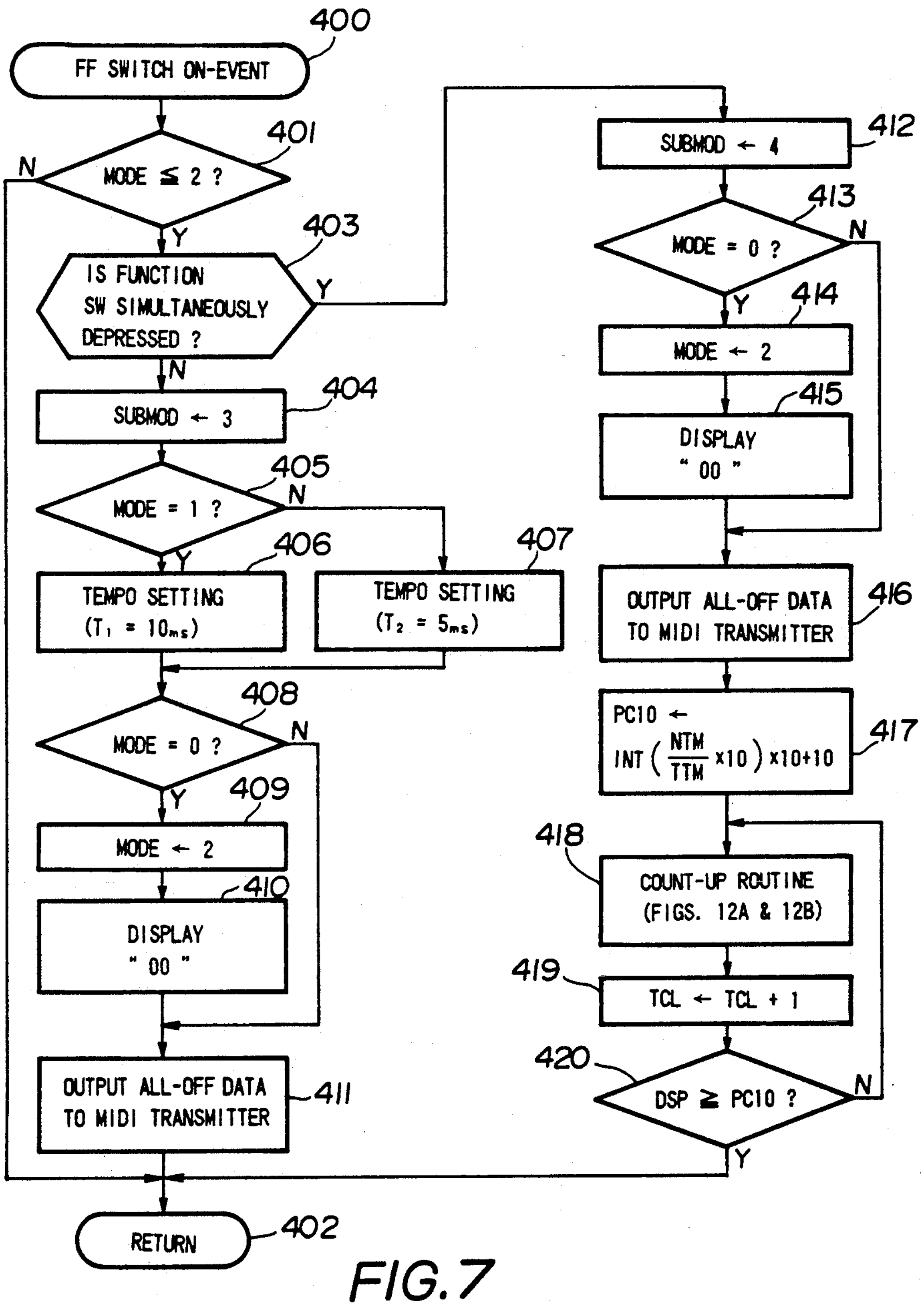
Figure 9:
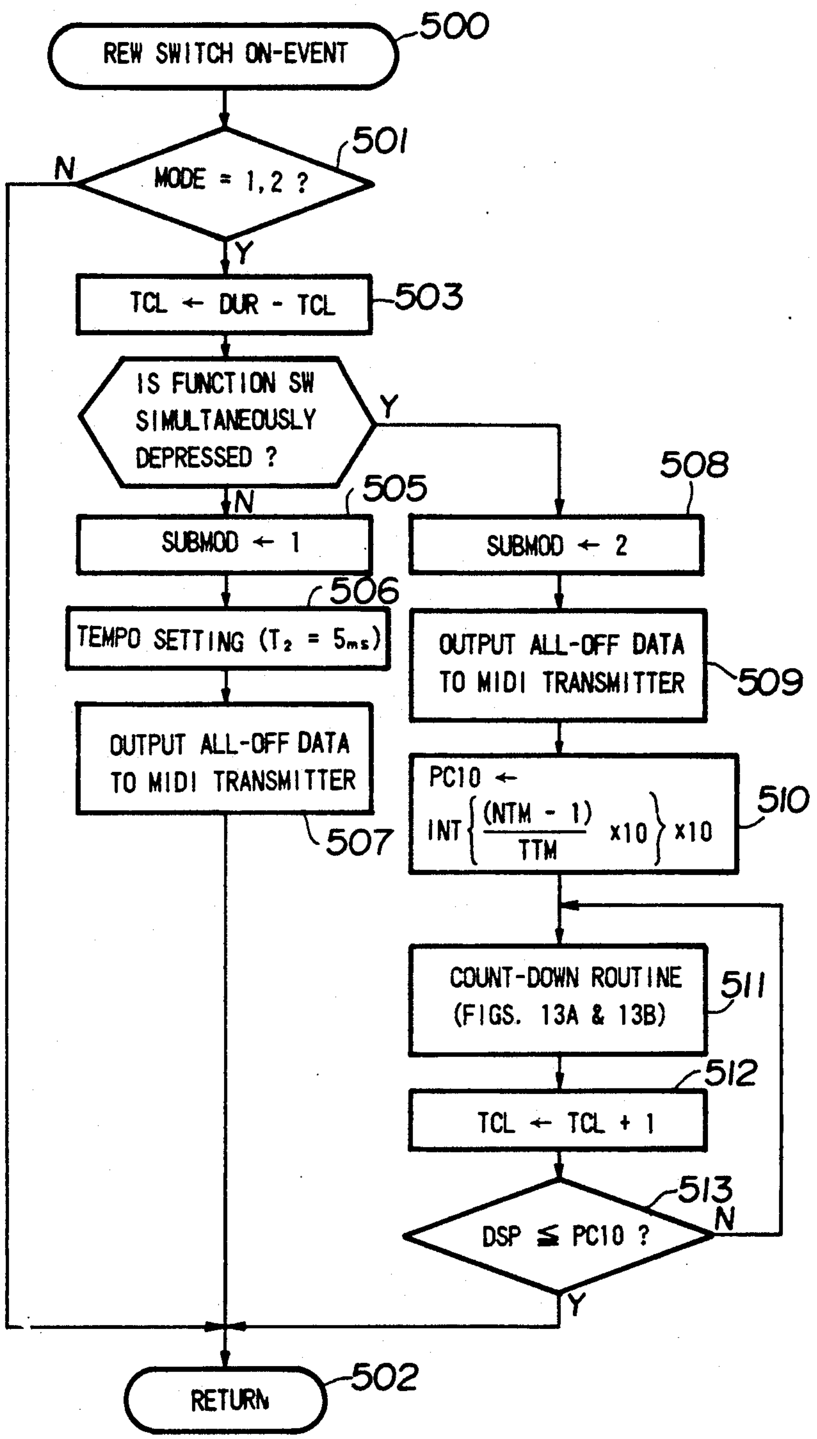
Figure 11A:
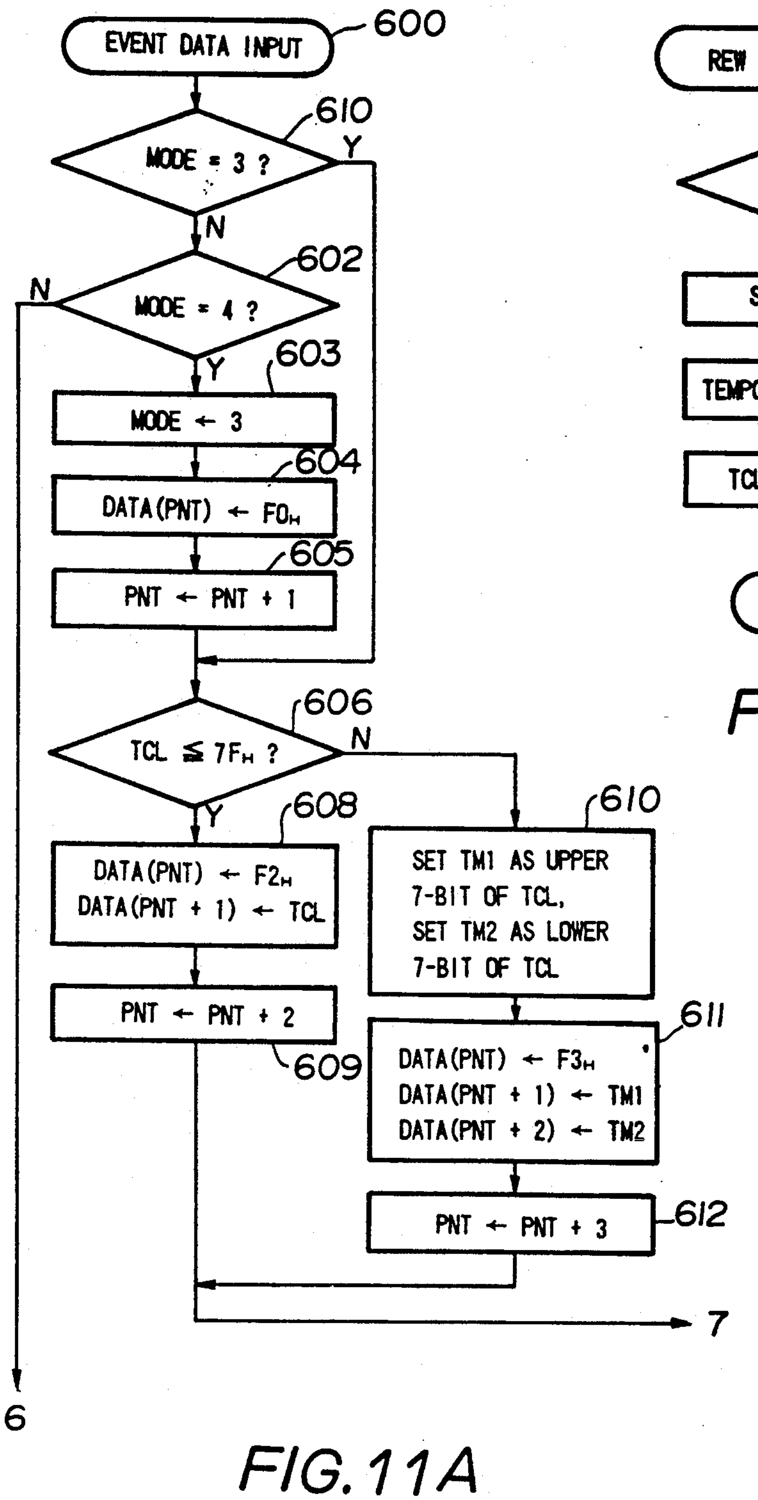
Figure 10:
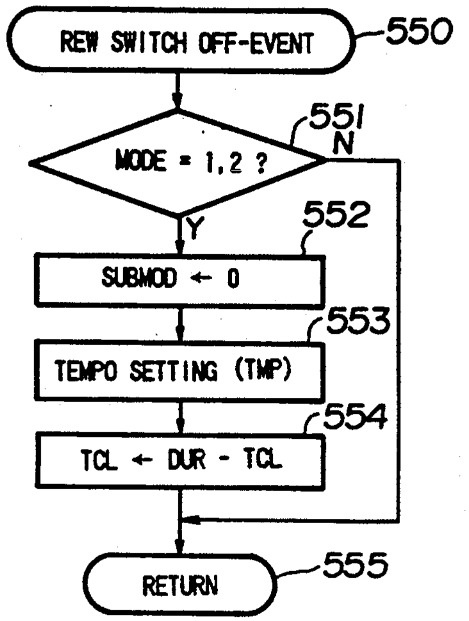
Figure 11B:
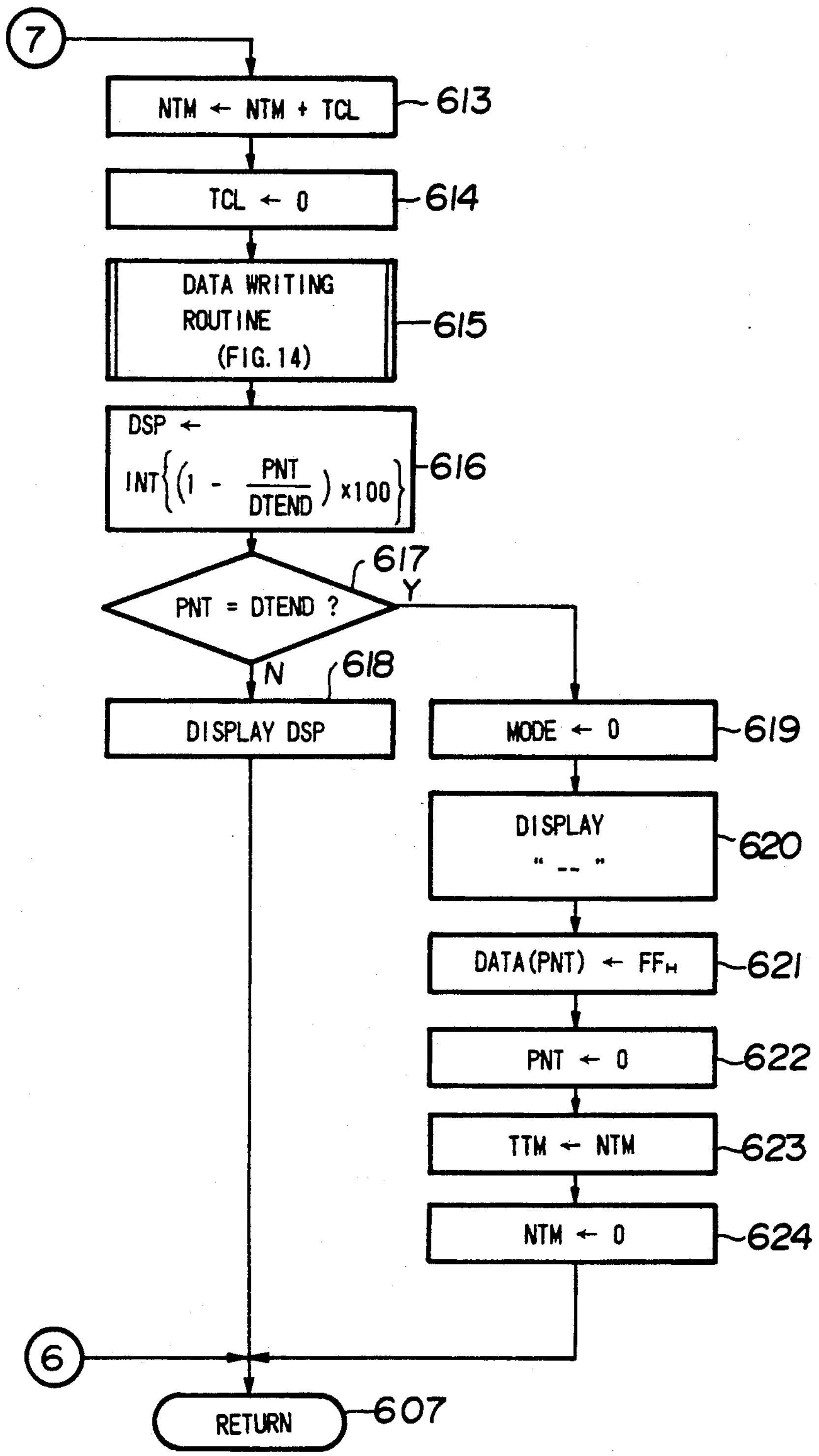

Next, description will be given with respect to the case where the writing of performance data is to be stopped. When the STOP switch 12 is operated while such writing of performance data is executed (i.e., MODE=3), the CPU 41 judges that there is the on-event of the STOP switch 12 in the step 103 so that its judgement result turns to "YES". Then, the processing proceeds to the step 103a (shown in FIG. 2A) wherein a "STOP switch on-event routine" (as shown in FIG. 5) will be executed. This routine is started from a step 330. Then, judgement result of a next step 331 turns to "YES", because the value of mode data MODE equals to "3". Hence, the processing proceeds to a step 332 wherein the tune end data "$FF_H$" are set to the input data DT1. Thereafter, the "event data input routine" (shown in FIGS. 11A and 11B) will be executed in a step 333. As described before, in this "event data input routine", the tempo clock TCL is written into the performance data memory 50 and its display operation is controlled. In addition, the "data writing routine" (shown in FIG. 14) is also executed in the step 615. In this case, the input data DT1 are set as "$FF_H$", so that the judgement results of steps 801 and 802 both turn to "NO" but the next judgement result of step 803 turns to "YES". Then, the processing proceeds to a step 810 wherein the inputted performance data DT1 (i.e., the tune end data "$FF_H$") are written at the address designated by the pointer PNT as the performance data DATA(PNT). In a next step 811, the total tempo clock number TTM is set as the present tempo clock number NTM. Thereafter, the execution of this "data writing routine" will be ended in the step 806. Thus, the performance data memory 50 will store the tune end data in addition to the value representative of the total tempo clock number TTM which is equivalent to the length of tune (i.e., the performance period of tune).

After executing the step 333 (shown in FIG. 5), the processing proceeds to a step 334 wherein the value of mode data MODE is reset to "0". In a next step 335, the CPU 41 cooperates with the display control circuit 10b to thereby control the display unit 18 to display the image "--". Then, the CPU 41 outputs all-off data to the MIDI transmitter 33 in a step 336. This all-off data forces the generation of musical tone signal in the tone source unit and electronic musical instrument which are connected to the MIDI transmitter 33 to stop. Hence, such all-off data are not required in the writing process of performance data, however, such all-off data are required in reading and outputting processes of performance data which will be described later. After executing the step 336, the CPU 41 sequentially executes steps 337 to 339 wherein all of the pointer PNT, present tempo clock number NTM and tempo clock TCL are initialized to "0". Then, the processing proceeds to a step 340, whereby the execution of this "STOP switch on-event routine" will be ended. Due to the execution of this routine, the record mode (i.e., MODE=3) is changed to the basic mode, i.e., the stop mode (MODE=0) as shown in FIG. 16.

Incidentally, in the case where the STOP switch 12 is operated in the record standby mode (i.e., MODE=4), the above-mentioned "STOP switch on-event routine" is executed. In such case, the value of mode data MODE is set to "4" so that the judgement result of step 331 turns to "NO" but the next judgement result of step 341 turns to "YES". Then, the processing proceeds to a step 342 wherein the tune end data "$FF_H$" are set to the input data DT1. Thereafter, the "data writing routine" (shown in FIG. 14) is executed in a next step 343. In this routine, the similar processes as in the case where the STOP switch 12 is operated in the record mode will be executed. More specifically, the tune end data "$FF_H$" are written in the performance data memory 50 in the step 810, and the total tempo clock number TTM is set as the present tempo clock number NTM in the step 811. After executing the step 343 (shown in FIG. 5), the CPU 41 will execute the processes of steps 334 to 339 which are described before. Then, the execution of the "STOP switch on-event routine" is ended in the step 340. Thus, similar to the case of record mode described before, this record standby mode is changed to the stop mode.

Meanwhile, when the storing capacity of the performance data memory 50 becomes full without operating the STOP switch 12 in the writing of performance data (where MODE=3), the judgement result of step 617 (shown in FIG. 11B) turns to "YES" in the execution of the "event data input routine". In other words, the CPU 41 judges that the pointer value PNT is equal to the last address DTEND of the memory 50. Then, after executing the steps 619 to 624, the processing proceeds to the step 607 wherein the execution of this "event data input routine" will be ended. In the processes of steps 619 to 624, the value of mode data MODE is set to "0" in the step 619; the display unit 18 is controlled to display the image "--" in the step 620; the tune end data "$FF_H$" are written in the performance data memory 50 as the performance data DATA(PNT) in the step 621; the pointer value PNT is initialized to "0" in the step 622; the total tempo clock number TTM is set as the present tempo clock number NTM in the step 623; and the present tempo clock number NTM is initialized to "0" in the step 624. As a result, the mode of present automatic performance apparatus is changed to the stop mode (i.e., MODE=0).

Further, when the START switch 11 is operated in the record mode (i.e., MODE=3), this record mode is changed to the record standby mode (i.e., MODE=4) as shown in FIG. 16. More specifically, when the START switch 11 is operated while the CPU 41 is executing the "main program", the CPU 41 starts to execute the "START switch on-event routine" (shown in FIG. 4) from the step 300. Then, the processing proceeds to the step 306 via the step 301. After executing this step 306, the processing proceeds to the step 305, whereby the execution of this "START switch on-event routine" is ended. In this case, the value of mode data MODE is set to "4" in the step 306 so that the record mode is changed to the record standby mode. This means that the START switch 11 functions as a pause switch in such case.

(2) Performance Reproducing Operation

When the START switch 11 is operated in the stop mode while the CPU 41 is executing the circulating processes consisting of the steps 102 to 110 (shown in FIGS. 2A and 2B), the CPU 41 detects the on-event of the START switch 11 so that the judgement result of step 102 turns to "YES". Then, the processing proceeds to the step 102*a* wherein the "START switch on-event routine" (shown in FIG. 4) is executed. In this routine, the value of mode data MODE has been already set to "0" so that the processing proceeds to a step 307 via the step 301. In the step 307, the value "1" is set to the mode data MODE. Then, the CPU 41 controls the display control circuit 10*b* such that the display unit 18 will display the image "00" in a step 308. Thereafter, the execution of this "START switch on-event routine" is ended in the step 305. Thus, the stop mode is changed to the play mode as shown in FIG. 16.

In such play mode, when the tempo oscillator 31 generates the tempo clock signal, the CPU 41 starts to execute the "tempo clock interrupt program" (shown in FIGS. 3A and 3B) from the step 200. Since the value of mode data MODE is set to "1", the judgement result of step 201 turns to "NO" but the next judgement result of step 203 turns to "YES". Then, the processing proceeds to a step 212 wherein it is judged whether the value of submode data SUBMOD is equal to "0", "3", "4" or not. In this case, the submode of the present automatic performance apparatus is set to the normal mode, so that the submode data SUBMOD takes the value "0". Hence, the judgement result of this step 212 turns to "YES", and the processing proceeds to a step 213 wherein a "count-up routine" (shown in FIGS. 12A and 12B) will be executed.

This "count-up routine" is started from a step 700, and then it is judged whether the tempo clock TCL is equal to the value of time data DUR or not in a step 701. If these two data are not equal, the judgement result of this step 701 turns to "NO" so that the processing directly proceeds to a step 702 (shown in FIG. 12B), whereby the execution of this "count-up routine" will be ended. Thereafter, the CPU 41 will execute the "tempo clock interrupt program" (shown in FIGS. 3A and 3B) again wherein the tempo clock TCL is sequentially incremented by "1" due to the process of step 205.

In such counting operation of the tempo clock TCL, when the tempo clock TCL becomes equal to the value of time data DUR, the judgement result of step 701 (shown in FIG. 12A) turns to "YES". Then, in a step 703, the performance data DATA(PNT) are read from the address designated by the pointer PNT within the performance data memory 50, and this read performance data DATA(PNT) are used as head data CD (i.e., identification data). Thereafter, processes of succeeding steps 704 to 708 will judge the kinds of performance data which succeed from the head data CD.

Figure 15:
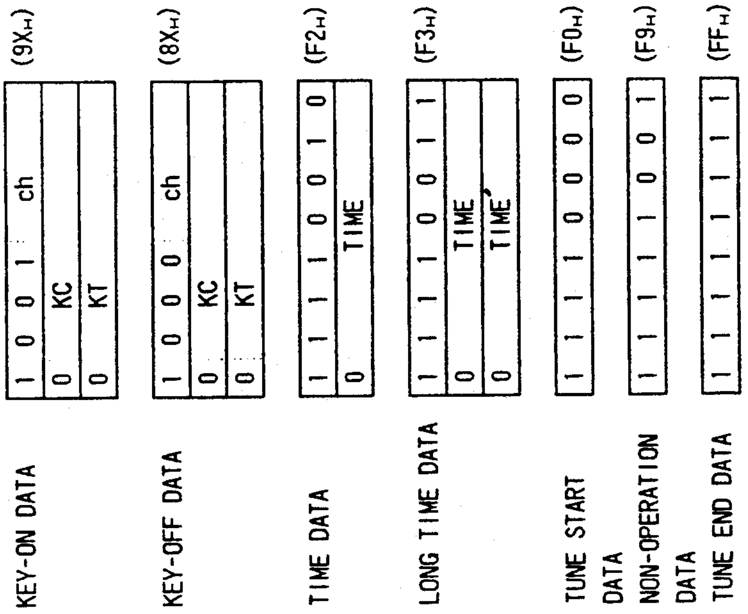
FIG. 15 shows an example of data format of the performance data stored in a performance memory shown in FIG. 1.

If the head data CD are the key-on data or the identification data "$9X_H$", "$8X_H$" concerning the key-off data, the mode data MODE takes the value "1" and the submode data SUBMOD take the value "0" so that judgement results of two succeeding steps 704 and 709 both turn to "YES". Then, the processing proceeds to a step 710. In this case, the performance data DATA(PNT+1) and DATA(PNT+2) are read from the performance data memory 50 under the designations of pointer values PNT+1 and PNT+2. Hence, in the step 710, the head data CD, and the performance data DATA(PNT+1) and DATA(PNT+2) are outputted to the MIDI transmitter 33. As shown in FIG. 15, these performance data DATA(PNT+1) and DATA(PNT+2) respectively correspond to the key code KC and key touch data KT. Thus, the MIDI transmitter transmits these three data CD, DATA(PNT+1) and DATA(PNT+2) to the electronic musical instrument and tone source unit etc. connected thereto, from which the musical tone signal is generated in response to the key code KC and key touch data KT. Then, the processing proceeds to a step 711 wherein the pointer PNT is incremented by "3". Thereafter, the processing returns to the foregoing step 703.

Meanwhile, if the head data CD set in the step 703 are the tune start data or the identification data "$F0_H$", "$F9_H$" concerning the non-operation data, the judgement result of step 704 turns to "NO" but the next judgement result of step 705 turns to "YES" so that the processing proceeds to a step 712 wherein the pointer PNT is incremented by "1". Then, the processing returns to the step 703. On the other hand, if the head data CD are the identification data concerning the tone color, tone volume and the like, all of the judgement results of steps 704 to 708 turn to "NO" so that the processing proceeds to a step 713 wherein the head data CD, the data representative of the tone color, tone volume and the like are outputted to the MIDI transmitter 33. In addition, the pointer PNT is incremented by the number of total bytes of these output data. Then, the processing returns to the step 703. Thus, the tone color, tone volume and the like of the musical tone signal generated in the electronic musical instrument and tone source unit will be controlled.

In the above-mentioned circulating processes consisting of the steps 703 to 713, the key-on data, key-off data, tune start data, non-operation data and other data are read out. When the head data CD become identical to the identification data "$F2_H$" concerning the time data in the step 703 while the CPU 41 is executing the above circulating processes, the judgement results of steps 704 and 705 both turn to "NO" but the next judgement result of step 706 turns to "YES" so that processes of steps 714 to 716 will be executed. In this case, the performance data DATA(PNT+1) designated by the pointer value PNT+1 are read from the performance data memory 50. This performance data DATA(PNT+1) are set as the time data DUR in the step 714. Then, the pointer PNT is incremented by "2" in the step 715, and the tempo clock TCL is initialized to "0" in the step 716.

Meanwhile, if the head data CD are the identification data "$F3_H$" concerning the long time data, the judgement results of steps 704 to 706 all turn to "NO" but the next judgement result of step 707 turns to "YES" so that steps 717 to 719 will be executed. In the step 717, the value of time data DUR is set in the following formula (2) based on two performance data DATA(PNT+1) and DATA(PNT+2).

$$DUR = \mathrm{DATA}(PNT+1)*80_H + \mathrm{DATA}(PNT+2) \qquad (2)$$

Under this formula (2), the data of two bytes each consisting of seven bits are converted into the data of fourteen bits. In this formula (2), "$*80_H$" means the carry of seven bits in the performance data DATA(PNT+1). After executing this step 717, the processing proceeds to the step 718 wherein the pointer PNT is incremented by "3". Then, the tempo clock TCL is initialized to "0".

As a result, due to the processes of steps 714 to 719, the time data DUR are set and the tempo clock TCL is initialized to "0" so that the reading of next performance data DATA(PNT) will be prepared. Then, due to the generation of the tempo clock signal from the tempo oscillator 31, the "tempo clock interrupt program" is executed so that the tempo clock TCL will be increased. When the tempo clock TCL becomes equal to the value of newly set time data DUR, the generation of musical tone signal is controlled in response to the reading operations of the key-on data, key-off data, tune start data, non-operation data and other data in the steps 703 to 713.

Incidentally, in the case where the value of time data DUR is judged to be equal to the tempo clock TCL so that the judgement result of step 701 turns to "YES", the non-operation data "$F9_H$" are read out as the performance data. Thereafter, the processing returns to the step 703 by the processes of steps 705 and 706. Then, the time data DUR are newly set in the steps 714 and 717, and the tempo clock TCL is initialized to "0" in the steps 716 and 719. Thus, the counting operation of the tempo clock TCL is re-started, and then the judging process of the step 701 will be executed. As described before, if the time intervals among plural performance event data concerning the key-on and key-off events etc. are too long, the non-operation data "$F9_H$" can be stored in the performance data memory 50 by the process of step 808 (shown in FIG. 14) which has been described before in the performance recording operation. In such case, the generation of musical tone is not controlled, but the counting operation of the tempo clock TCL is substantially executed for a long time.

Next, description will be given with respect to the display operation of the display unit 18 in the above-mentioned performance reproducing operation. After executing the steps 716 and 719 (shown in FIG. 12B), the processing proceeds to a step 720 wherein the present tempo clock number NTM is accumulated by adding the value of time data DUR to the number NTM at every time when the time data DUR are renewed. In a next step 721, the display data DSP are set in the following formula (3) based on such accumulated present tempo clock number NTM and the total tempo clock number TTM representative of the sum of tempo clock number TCL in one tune.

$$DSP = INT(NTM*100/TTM) \qquad (3)$$

Thus, the display data DSP can indicate the progressing position of tune corresponding to the performance time by percentage. After executing the step 721, the CPU 41 cooperates with the display control circuit **10*b* to thereby control the display unit 18 to display the value corresponding to the display data DSP in a next step 722. Thereafter, the execution of this "count-up routine" will be ended in the step 702**. Thus, it becomes possible to visually display the percentage representative of the progressing position of automatic performance within the whole time length of musical tune.

Meanwhile, if some time is passed in such reproducing operation of the automatic performance, the tune end data "$FF_H$" read from the performance data memory 50 can be set as the head data CD. In such case, the judgement results of steps 704 to 707 all turn to "NO" but the next judgement result of step 708 turns to "YES", so that the processing proceeds to a step 723 wherein the all-off data are outputted to the MIDI transmitter 33 Thus, contrary to the above-mentioned case, the generation of musical tone signal is forced to be stopped. After executing this step 723, the value of mode data MODE is set to the value "2" in a step 724. Due to succeeding steps 725 to 728, all of the tempo clock TCL, value of time data DUR, pointer PNT and present tempo clock number NTM are initialized to "0". Then, the execution of the "count-up routine" is ended in the step 702. Thus, the play mode is changed to the play standby mode as shown in FIG. 16. In addition, the value of variable data such as the pointer PNT which is necessary for reading out the performance data is set to the initial value.

In the case where the START switch 11 is operated before all of the performance data are completely read from the memory 50 in the play mode (i.e., MODE=1), the "START switch on-event routine" (shown in FIG. 4) is executed by the processes of steps 102 and 102*a* (shown in FIG. 2A). In this case, the value of mode data MODE is set to "1", so that the processing of this routine proceeds to the step 309 via the steps 300 and 301. In this step 309, the value of mode data MODE is set to "2". In the next step 310, the all-off data are outputted to the MIDI transmitter 33 so that the generation of musical tone signal is stopped. Then, the execution of this routine will be ended in the step 305. Thus, the mode of automatic performance apparatus is changed from the play mode to the play standby mode in the middle of the reading operation of performance data as shown in FIG. 16. Similar to the case of record mode, the START switch 11 can also function as the pause switch.

In the above play standby mode, the value of mode data MODE is set to "2", while the value of submode data SUBMOD has been set to "0" in advance. Therefore, even if the tempo oscillator 31 outputs the tempo clock signal so that the "tempo clock interrupt program" (shown in FIGS. 3A and 3B) is executed, the judgement results of steps 201 and 203 both turn to "NO"; the judgement result of step 204 turns to "YES"; and then the judgement results of steps 214 and 215 both turn to "NO", whereby the execution of this program will be ended in the step 202. Thus, in the "tempo clock interrupt program", the generation of musical tone signal is not controlled without substantially executing its processes.

On the contrary, when the START switch 11 is operated in such play standby mode (i.e., MODE=2), the "START switch on-event routine" (shown in FIG. 4) is executed by the processes of steps 102 and 102*a* (shown in FIG. 2A). Since the value of mode data MODE is set to "2", the processing of this routine proceeds to a step 311 via the steps 300 and 301. In the step 311, the value of mode data MODE is set to "1". Then, the execution of this routine is ended in the step 305. Thus, the mode of automatic performance apparatus is changed from the play standby mode to the play mode so that the reading operation of performance data which has been stopped will be re-started.

Further, when the STOP switch 12 is operated in the play mode (i.e., MODE=1) or the play standby mode (i.e., MODE=2), the "STOP switch on-event routine" (shown in FIG. 5) is executed by the processes of steps 103 and 103*a* (shown in FIG. 2A). Since the value of mode data MODE is set to "1" or "2", the judgement results of steps 331 and 341 both turn to "NO". Then, the processing proceeds to the step 334 wherein the value "0" is set to the mode data MODE. In the step 335, the display unit 18 is controlled to display the image "--". In the step 336, the all-off data are outputted to the MIDI transmitter 33 so that the generation of musical tone signal in the electronic musical instrument and tone source unit is forced to be stopped. Then, in the steps 337 to 339, all of the pointer PNT, present tempo clock number NTM and tempo clock TCL are initialized to "0". Thereafter, the execution of this "STOP switch on-event routine" is ended in the step 340. Due to the execution of this routine, the mode of automatic performance apparatus is changed from the play mode or play standby mode to the stop mode (i.e., MODE=0).

(3) Fast Feeding Operation

Next, description will be given with respect to the fast feeding (FF) operation which is executed in response to the operation of FF switch 13 by a speed faster than the normal performance reproducing speed. This FF operation is valid in the stop mode (i.e., MODE=0), play mode (i.e., MODE=1) and play standby mode (i.e., MODE=2).

When the FF switch 13 is depressed while the CPU 41 is executing the "main program" (shown in FIGS. 2A and 2B), the CPU 41 detects the on-event of the FF switch 13 so that the judgement result of step 105 turns to "YES". Hence, the processing proceeds to the step 105*a* wherein the "FF switch on-event routine" (shown in FIG. 7) will be executed. This routine is started from a step 400, and then it is judged whether the value of mode data MODE is equal to or smaller than "2" or not in a step 401. If the value of mode data MODE is larger than "2", the judgement result of this step 401 turns to "NO", so that the processing directly proceeds to a step 402 by which the execution of this routine will be ended. On the contrary, when the value of mode data MODE is not larger than "2", the judgement result of step 401 turns to "YES". Then, the processing proceeds to a step 403 from the step 401. Thus, if the mode of automatic performance apparatus is the record mode or record standby mode, such FF operation is neglected. This FF operation is valid only when the present mode is one of the stop mode, play mode and play standby mode.

At first, description will be given with respect to the case where the FF switch 13 and function switch 16 are not simultaneously operated. In such case, the judgement result of step 401 is "YES" but the next judgement result of step 403 is "NO", so that the processing proceeds to a step 404 wherein the value of submode data SUBMOD is set to "2". As a result, the submode of automatic performance apparatus is set to the FF mode in which the pointer PNT is subjected to the fast feeding. Then, the processing proceeds to a step 405 wherein it is judged whether the value of mode data MODE is equal to "1" or not. If the value of mode data MODE is equal to "1", the judgement result of step 405 turns to "YES" so that the processing proceeds to a step 406 wherein the period of tempo clock signal generated from the tempo oscillator 31 is set to $T_1$. On the contrary, if the value of mode data MODE is not equal to "1", the judgement result of step 405 turns to "NO" so that the processing proceeds to a step 407 wherein the period of tempo clock signal is set to $T_2$. In the present embodiment, the period $T_1$ is set around 10 milliseconds, while another period $T_2$ is set around 5 milliseconds. Each of these periods $T_1$ and $T_2$ is set to the fraction or decimal fraction of the period of tempo clock signal in the normal performance. In other words, these periods $T_1$ and $T_2$ are used for increasing the tempo of automatic performance. In addition, the tempo in the case where the value of mode data MODE is set to "0" or "2" is set faster than that in the case where the value of mode data MODE is set to "1". Because, by the processes which will be described later, the generation of musical tone signal is permitted in the case where the value of mode data MODE is "1", but the generation of musical tone signal is prohibited in other cases.

Next, the processing proceeds to a step 408 wherein it is judged whether the value of mode data MODE is equal to "0" or not. If the value of mode data MODE is equal to "0", the processing proceeds to a step 409 wherein the value of mode data MODE is changed to "2". In this case, the display unit 18 is controlled to display the image "00" in a step 410, and then the processing proceeds to a next step 411. On the contrary, when the value of mode data MODE is not equal to "0", the processing directly proceeds to the step 411 from the step 408. Due to the processes of steps 408 to 410, when the FF switch 13 is operated in the stop mode (i.e., MODE=0), this stop mode is changed to the play standby mode (i.e., MODE=2). However, when the mode of automatic performance apparatus is set to the play mode or play standby mode, such mode is not changed by the operation of FF switch 13. Thereafter, the CPU 41 outputs the all-off data to the MIDI transmitter 33 in the step 411, whereby the musical tone signal which has been generated is stopped. Then, the execution of the "FF switch on-event routine" is ended in the step 402.

In such case, the tempo oscillator 31 generates the tempo clock signal by a speed which is faster than that in the normal case. At every time when this tempo clock signal is generated, the "tempo clock interrupt program" (shown in FIGS. 3A and 3B) is executed. In the execution of this "tempo clock interrupt program", the value of mode data MODE is set to "1" or "2" and the value of submode data SUBMOD is set to "3". Hence, the judgement result of step 201 turns to "NO" but the following judgement results of steps 203 and 212 both turn to "YES", so that the processing proceeds to the step 213 wherein the "count-up routine" (shown in FIGS. 12A and 12B) is executed. Or, the judgement results of steps 201 and 203 both turn to "NO" but the following judgement results of steps 204 and 214 both turn to "YES", so that the processing proceeds to a step 216 wherein the "count-up routine" is executed. By the execution of the "count-up routine", the performance data are read out, the pointer PNT is incremented, and the progressing position of automatic performance is displayed. When the value of mode data MODE is "2", the judgement result of step 709 turns to "NO" so that the CPU 41 does not execute the step 710 wherein the performance data are outputted to the MIDI transmitter 33. For this reason, the musical tone signal will not be generated. After executing the "count-up routine" in the steps 213 and 216 (shown in FIGS. 3A and 3B), the processing proceeds to a step 205 wherein the tempo clock TCL is incremented by "1". Due to such process, the tempo clock TCL and pointer PNT are incremented with high speed as long as the FF switch 13 is depressed.

Meanwhile, when the depressing of FF switch 13 is released, a "FF switch off-event routine" (shown in FIG. 8) is executed by processes of steps 106 and **106*a* (shown in FIG. 2A). This routine is started from a step 450, and then it is judged that the value of mode data MODE is smaller than "2" in a step 451. Hence, the judgement result of this step 451 turns to "YES" so that the processing proceeds to a next step 452 wherein the value "0" is set to the submode data SUBMOD. Then, the processing proceeds to a step 453 wherein the period of tempo clock signal generated from the tempo oscillator 31 is set equivalent to the value of tempo data TMP, i.e., the value corresponding to the operating position of the tempo controller 17 by the process of step 110 (shown in FIG. 2B). Thereafter, the execution of this "FF switch off-event routine" is ended in a step 454. Thus, the submode of automatic performance apparatus is reset to the original normal mode, while the reading speed of performance data is also reset to the original reading speed. Incidentally, the judging process of step 451 corresponds to the judging process of step 401 (shown in FIG. 7). Hence, even if the FF switch 13 is operated in the record mode (i.e., MODE=3) and record standby mode (MODE=4**), its operation is neglected.

Next, description will be given with respect to the case where the FF switch 13 and function switch 16 are simultaneously operated. In such case, the judgement result of step 403 turns to "YES" in the "FF switch on-event routine" (shown in FIG. 7), and then the processing proceeds to the step 412 wherein the value of submode data SUBMOD is set to "4". Thus, the submode of automatic performance apparatus is set to the jump mode wherein the pointer value PNT is jumped over by a certain amount (whose maximum corresponds to about 10% of the performance progressing position). After executing the step 412, the CPU 41 executes processes of steps 413 to 415 (which are similar to those of the steps 408 to 410). Therefore, if the mode of automatic performance apparatus has been set to the stop mode (i.e., MODE=0), this stop mode is changed to the play standby mode (i.e., MODE=2). However, if the present mode has been set to the play mode and play standby mode, these modes are not changed (see FIG. 16). In addition, the display unit 18 is controlled to display the image "00". In the step 416, all-off data are outputted to the MIDI transmitter 33, so that the generation of musical tone signal which has been generated beforehand must be stopped.

Next, the CPU 41 sets the jump data PC10 in the following formula (4) based on the present tempo clock number NTM and total tempo clock number TTM.

$$PC10=INT(NTM*10/TTM)*10+10 \qquad (4)$$

In the operation of INT(NTM*10/TTM)*10 in this formula (4), the first order of the display data DSP=INT(NTM*100/TTM) representing the percentage of progressing position of tune is omitted. Then, such omitted data is added with "10", so that the jump data PC10 will indicate the progressing position which is ahead of the progressing position corresponding to the present tempo clock number NTM by 10% at maximum. For example, if the present progressing position is designated by 24%, the jump data indicating the progressing position is designated by 30%.

After executing the step 417, the CPU 41 executes the "count-up routine" in a step 418, and then the tempo clock is incremented by "1" in a next step 419. Thereafter, the processing proceeds to a step 420 wherein it is judged whether the display data DSP is equal to or larger than the jump data PC10 or not. By this step 420, the circulating processes consisting of the steps 418 to 420 are repeatedly executed until the display data DSP becomes equal to or larger than the jump data PC10. Incidentally, in the execution of the "count-up routine", the performance data are read out; the pointer PNT is incremented; and the progressing position of automatic performance is displayed as described before. However, since the value of submode data SUBMOD is set to "4", the judgement result of step 709 (shown in FIG. 12A) turns to "NO". Therefore, the process of step 710 is jumped over so that the performance data are not outputted to the MIDI transmitter 33. In this case, the musical tone signal will not be generated.

In the incrementing operation of the tempo clock TCL and renewing operation of the display data DSP, when the display data DSP becomes larger than the jump data PC10, the judgement result of step 420 (shown in FIG. 7) turns to "YES". Therefore, the processing proceeds to the step 402, whereby the execution of the "FF switch on-event routine" is ended. Thus, the pointer PNT is incremented by jumping, and this pointer value is advanced by a certain amount corresponding to the length of tune to be performed.

In such state, when the depressed FF switch 13 is released, the "FF switch off-event routine" consisting of the steps 450 to 454 (shown in FIG. 8) is executed as similar to the case where the FF switch 13 is operated without operating the function switch 16. Thus, the submode of automatic performance apparatus is reset to the normal mode, and the reading speed of performance data is also reset to the original speed.

On the other hand, when the FF switch 13 and function switch 16 are simultaneously depressed after the depression of FF switch 13 is released, the "FF switch on-event routine" (shown in FIG. 7) is repeatedly executed so that the progressing position of automatic performance is advanced by about 10% every time such simultaneous depression is performed. By repeatedly performing such operation, the progressing position of automatic performance is advanced by 10%. Hence, it is easy to obtain the desirable progressing position.

(4) Rewinding Operation

Next, description will be given with respect to the rewinding operation by which the pointer value PNT is decremented (rewound) in response to the operation of REW switch 14 with the speed higher than the normal performance speed. This rewinding operation is valid in the play mode (i.e., MODE=1) and play standby mode (MODE=2).

When the REW switch 14 is depressed while the CPU 41 is executing the "main program", the on-event of REW switch 14 is detected so that the judgement result of step 107 (shown in FIG. 2A) turns to "YES". Hence, the processing proceeds to a step 107*a* wherein the "REW switch on-event routine" (shown in FIG. 9) will be executed. This "REW switch on-event routine" is started from a step 500, and then it is judged whether or not the value of mode data MODE is equal to "1" or "2" in a step 501. When this mode data MODE takes a value other than the values "1" and "2", the judgement result of step 501 turns to "NO" so that the processing directly proceeds to a step 502, whereby the execution of this routine is ended. On the other hand, when the mode data MODE takes the value "1" or "2", the judgement result of step 501 turns to "YES" so that the processes after a step 503 will be executed. This means that this REW mode is valid in the play mode and play standby mode, however, this REW mode is neglected in the stop mode, record mode and record standby mode.

First, description will given with respect to the case where the REW switch 14 and function switch 16 are not simultaneously depressed. In this case, the processing proceeds to the step 503 wherein the value obtained by subtracting the value of tempo clock TCL from the value of time data DUR is set as the new tempo clock TCL. Due to the operation of TCL=DUR-TCL, the value of time data DUR which is progressing during the incrementing operation of tempo clock TCL is set as the new initial value of tempo clock TCL. By executing the "tempo clock interrupt program" (shown in FIGS. 3A and 3B) including the "count-down routine" (shown in FIGS. 13A and 13B), the preceding value of temp clock TCL is counted down so that the progressing position of automatic performance is rewound by such preceding value of tempo clock TCL.

Then, judgement result of a step 504 is "NO" so that the processing proceeds to a step 505 wherein the value of submode data SUBMODE is set to "1". Then, the period of tempo clock signal generated from the temp oscillator 31 is set to $T_1$ (e.g. 5 milli-seconds) in a step 506. In a next step 507, the all-off data are outputted to the MIDI transmitter 33 so that the generation of musical tone signal if prohibited. Then, the execution of the "REW switch on-event routine" is ended in the step 502. Due to the above-mentioned processes, the present mode is set to the REW mode wherein the pointer value PNT is sequentially decremented with high speed so that the tempo oscillator will generate the tempo clock signal frequently.

At every time when such tempo clock signal is generated, the "tempo clock interrupt program" (shown in FIGS. 3A and 3B) is executed. Before the execution of the "tempo clock interrupt program", the value of mode data MODE is set to "1" or "2" and the value of submode data SUBMOD is set to "1". Therefore, the judgment result of step 201 turns to "NO", the judgement result of step 203 turns to "YES" and then the judgement result of step 212 turns to "NO", so that the "count-down routine" (shown in FIGS. 13A and 13B) will be executed in the step 217. Or, the judgement results of steps 201 and 203 both turn to "NO", the judgement result of step 204 turns to "YES", the judgement result of step 214 turns to "NO" and then the judgement result of step 215 turns to "YES", so that the "count-down routine" will be executed in the step 218. This "count-down routine" is started from a step 750, and then it is judged whether or not the performance data (DATA(PNT) are the tune start data "$F0_H$" in a step 751. If the performance data DATA(PNT) are the tune start data "$F0_H$", the judgement result of step 751 turns to "YES" so that the processing directly proceeds to a step 752 (shown in FIG. 13B) wherein the execution of this "count-down routine" will be ended. Due to the above-mentioned processes, the pointer value PNT is returned back to the head position of performance data, and then the decrementing of pointer PNT is prohibited.

On the other hand, if the performance data (DATA(PNT) are not the tune start data "$F0_H$", the judgement result of step 751 turns to "NO" so that the processes after the step 753 will be executed.

Figure 3B:
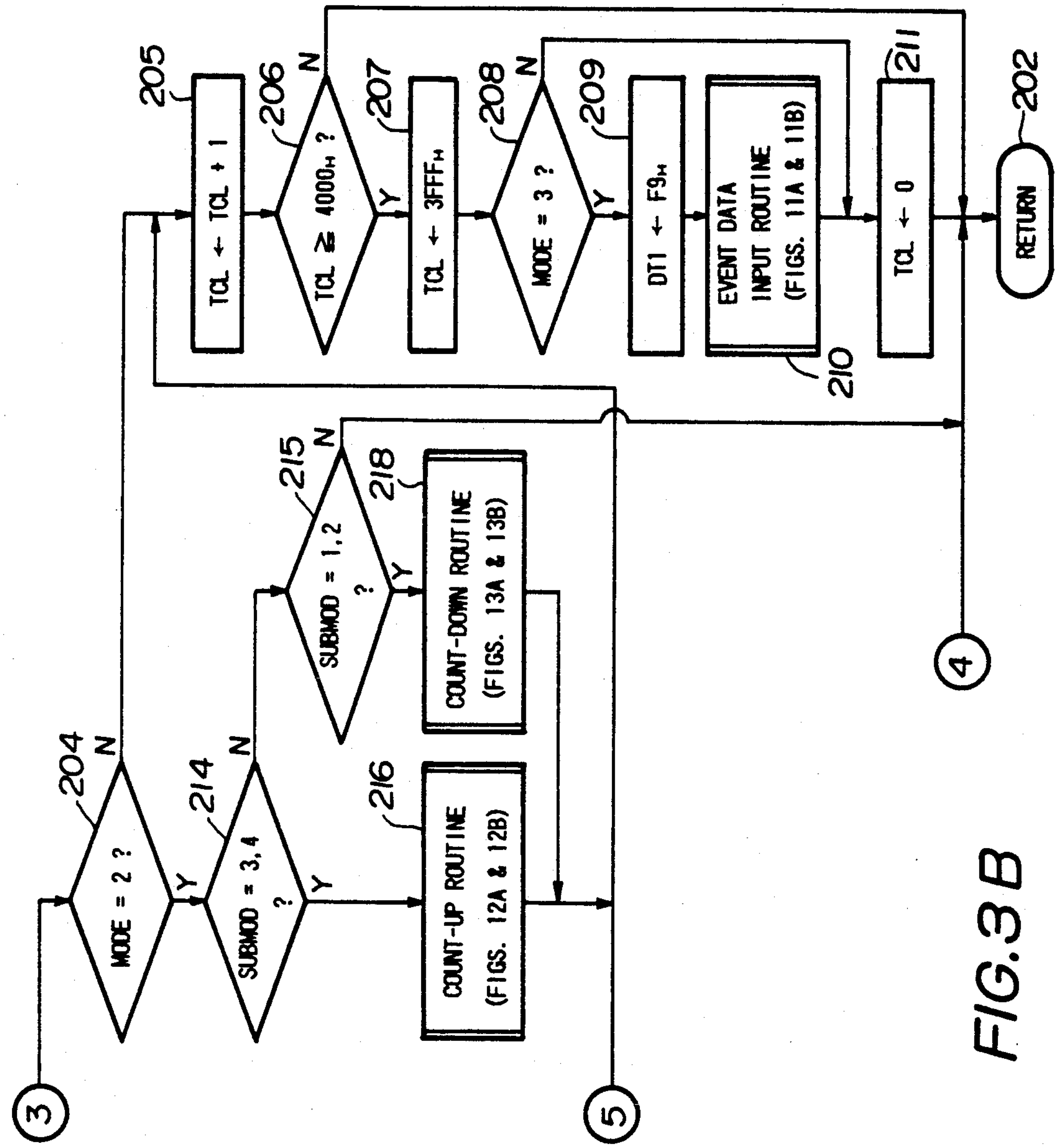
Figure 4:
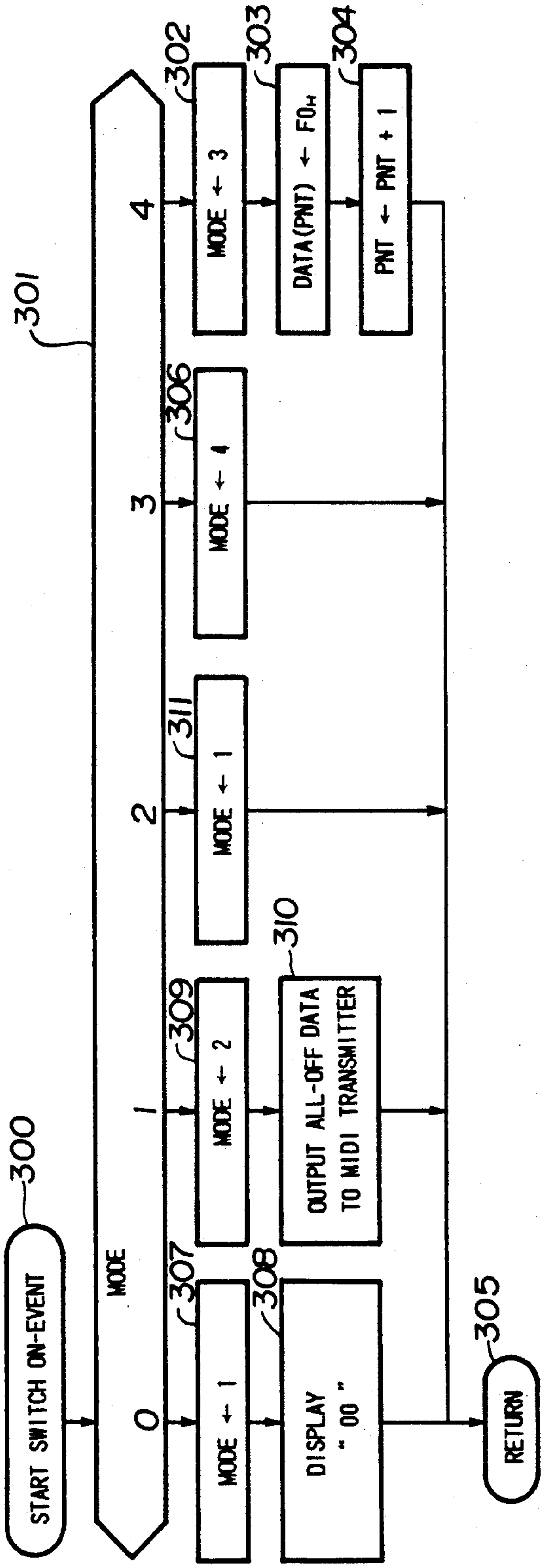

If this step 753 judges that the tempo clock TCL has not been identical to the value of time data DUR yet, the judgement result thereof turns to "NO" so that the execution of the "count-down routine" will be ended in the step 752, and then the processing returns to the execution of the "tempo clock interrupt program" from the step 205 (shown in FIG. 3B). Due to the process of this step 205, the tempo clock TCL is sequentially incremented. Due to such "tempo clock interrupt program" including the "count-down routine", the tempo clock TCL is incremented so that its value will be equal to the value of time data DUR. At this time, the judgement result of step 753 (shown in FIG. 13A) turns to "YES" so that a variable i is set as the value of "PNT-1". Then, by the circulating processes consisting of steps 755 to 758, the CPU 41 searches the time data or long time data while the address value of the performance data memory 50 is rewound. It is obvious from FIG. 15, the process of step 755 for judging whether the MSB of performance data (DATA(i) is "1" or not is equivalent to the process for searching the identification data. In addition, the process of step 756 for judging whether the performance data DATA(i) have the value "$F2_H$" or "$F3_H$" or not is equivalent to the process for searching the identification data concerning the time data or long time data. Further, the processes of steps 757 and 758 are both equivalent to the process for decrementing the address of performance data memory 50.

Figure 13A:
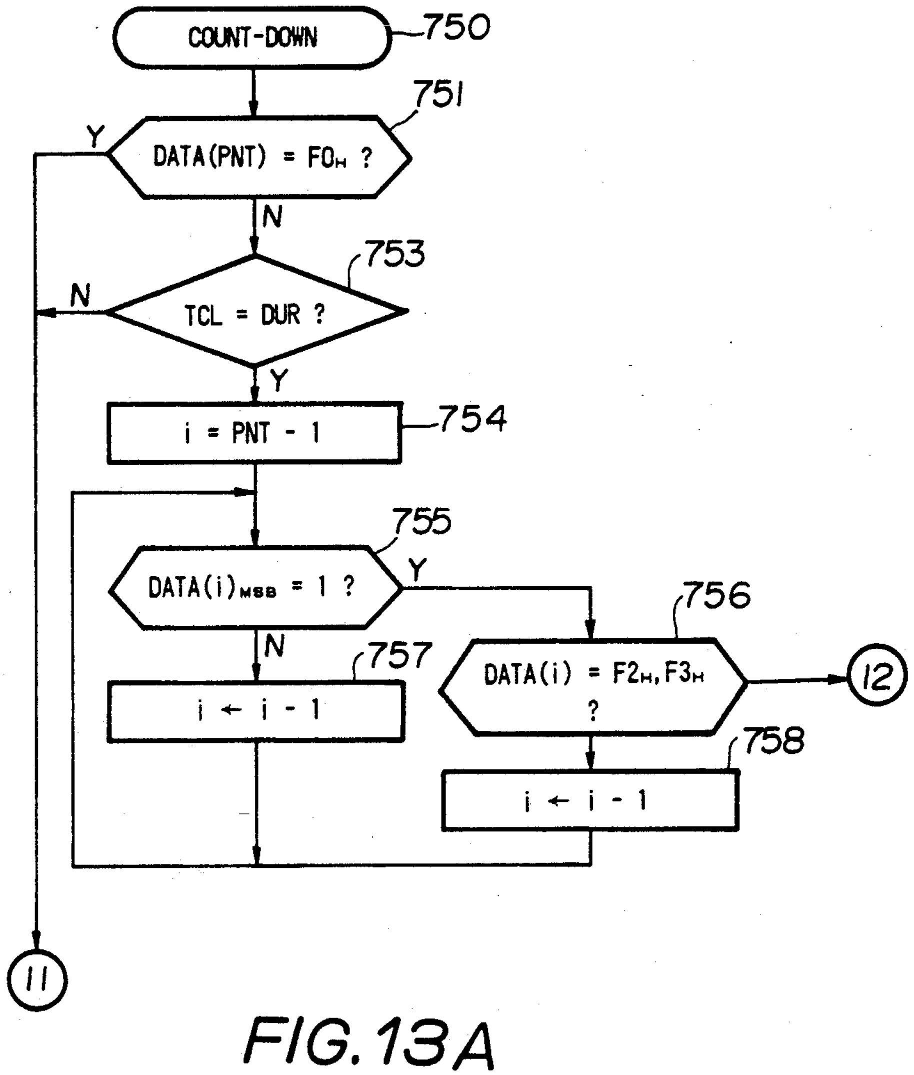
Figure 13B:
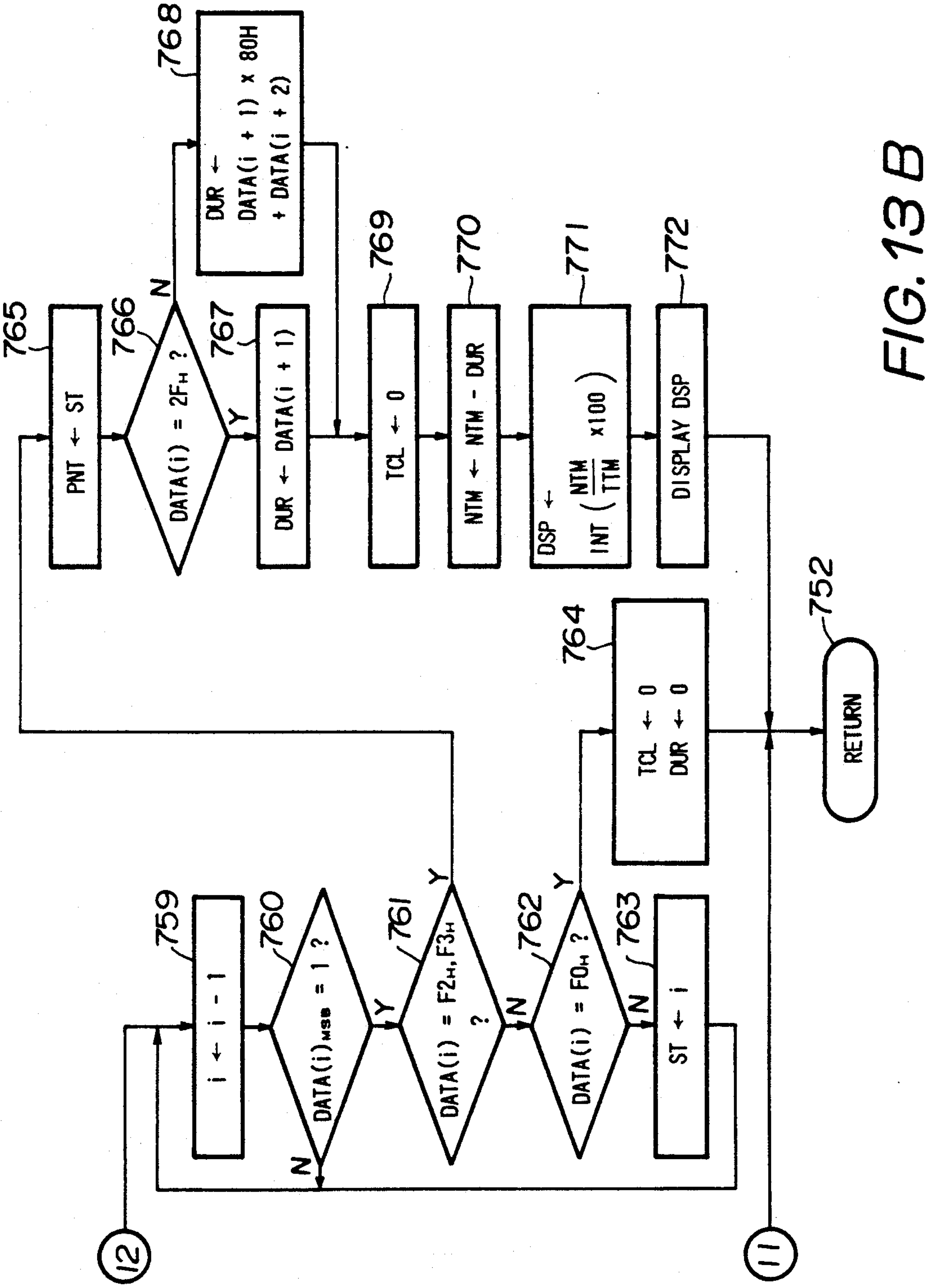
Figure 14:
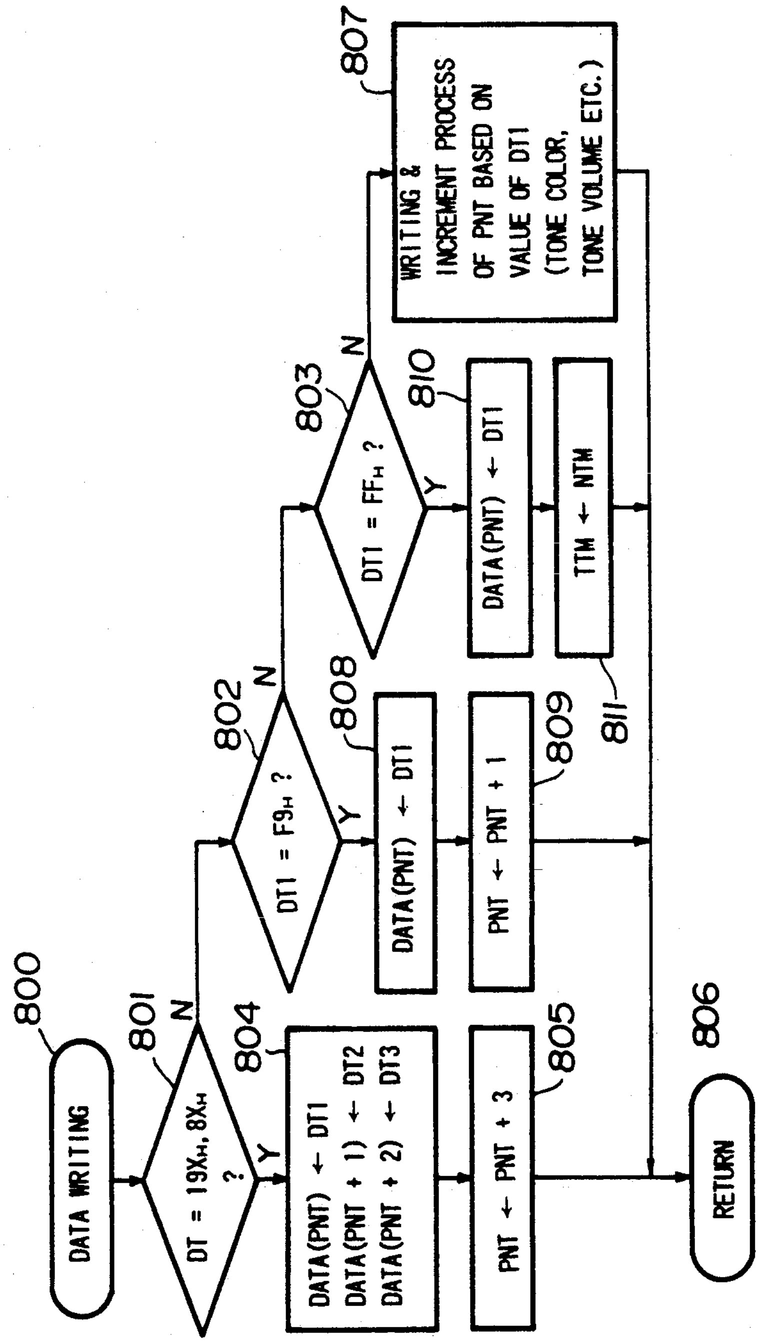

During the execution of the circulating processes consisting of these steps 755 to 758, when the identification data concerning the time data or long time data are searched, the judgement result of step 756 turns to "YES" so that the processing proceeds to a step 759 (shown in FIG. 13B). By executing the circulating processes consisting of the steps 759 to 763, the address value of performance data memory 50 is rewound such that the CPU 41 can search the identification data concerning the time data or long time data. In such circulating processes, the step 759 corresponds to the steps 757 and 758; the step 760 corresponds to the step 755; the step 761 corresponds to the step 756; and the step 762 corresponds to the step 751. Then, in the step 763, the address (i.e., forward address) which is advanced in the progressing direction of the tune is temporarily stored as the variable ST based on the searched time data and long time data. Thereafter, by repeatedly executing the above-mentioned circulating processes, the address value of the performance data memory 50 is rewound such that the CPU 41 will search the time data and long time data again. When the CPU 41 searches out such data again, the judgement result of step 761 turns to "YES" so that the variable ST which has been prestored in the step 763 is set as the pointer value PNT in a step 765. Due to these processes of steps 763 and 765, as similar to the case of reading and reproducing operation of performance data, the pointer value PNT is set equivalent to the storing address value of the data concerning the performance event of time data and long time data next to the preceding performance event of time data and long time data corresponding to the progressing time data DUR within the performance data memory 50. Therefore in order to search out the preceding time data after searching out the identification data concerning the time data and long time data, two sets of circulating processes consisting of the steps 755 to 758 and the steps 759 to 763 must be required.

During the execution of the circulating processes consisting of the steps 759 to 763, when the read performance data DATA(i) become identical to the tune start data "$F0_H$", the judgement result of step 762 turns to "YES", the tempo clock TCL and time data DUR are both initialized to "0". Then, the execution of this "count-down routine" is ended in the step 752. Thus, similar to the process of step 751, the pointer value PNT is rewound back to the head position of performance data, and then the rewinding of this pointer PNT is prohibited.

Be executing the circulating processes consisting of the steps 759 to 763, the identification codes "$F2_H$" and "$F3_H$" concerning the time data and long time data are searched out. Then, the pointer value PNT is newly set in a step 765, and thereafter the CPU 41 judges whether the identification code (i.e., the performance data DATA(i) is identical to the data "$F2_H$" or not in a step 766. If this identification code is identical to the data "$F2_H$", the judgement result of step 766 turns to "YES" so that the processing proceeds to a step 767. In this step 767, the performance data DATA(i+1) designated by the variable (i.e., pointer value) "i+1" are read from the performance data memory 50, and the value of such performance data DATA(i+1) is set to the time data DUR. On the contrary, if the identification data are identical to the data "$F3_H$", the judgement result of step 766 turns to "NO" so that the processing proceeds to a step 768 wherein the value of time data DUR is set by the following formula (5) based on two performance data DATA(i+1) and DATA(i+2) which are designated by the variables "i+1" and "i+2".

$$DUR = \mathrm{DATA}(i+1) * 80_H + \mathrm{DATA}(i+2) \quad (5)$$

Similar to the foregoing formula (2), the data of two bytes each consisting of seven bits are converted into the data of fourteen bits in the formula (5).

After executing the steps 767 and 768, the CPU 41 initializes the tempo clock TCL to "0" in a step 769. In a next step 770, the present tempo clock number NTM is renewed by subtracting the value of set time data DUR from the present tempo clock number NTM at every time when the time data DUR are renewed. Then, the processing proceeds to a step 771 wherein the display data DSP is set by executing the following formula (6) based on the present tempo clock number NTM and total tempo clock number TTM.

$$DSP = INT(NTM * 100 / TTM) \quad (6)$$

This formula (6) is identical to the foregoing formula (3), so that the display data DSP represents the percentage indicative of the progressing position of the tune corresponding to the performance time. Next, the CPU 41 cooperates with the display control circuit **10*b* to thereby control the display unit 18 to display the value corresponding to the display data DSP in a step 772. Then, the execution of the "count-down routine" is ended in the step 752**. Thus, the progressing state of automatic performance can be visually displayed even in the rewinding operation.

As described above, due to the execution of the "tempo clock interrupt program" including the "count-down routine" which is executed at every time when the tempo oscillator 31 generates the high-speed tempo clock signal, the pointer value PNT is decremented with high speed as long as the REW switch 14 is depressed.

Meanwhile, when the depression of REW switch 14 is released, the "REW switch off-event routine" (shown in FIG. 10) is executed in the steps 108 and **108*a* (shown in FIG. 2B). This routine is started from a step 550, and then it is judged whether or not the value of mode data MODE is equal to "1" or "2" in a step 551. If the judgement result of this step 551 is "YES", the value of submode data SUBMOD is set to "0". In a next step 553, the period of tempo clock signal is set equivalent to the value of tempo data TMP, i.e., the value corresponding to the operating position of tempo controller 17 by the process of step 110 (shown in FIG. 2B). At this time, the value "DUR-TCL" is calculated by subtracting the present tempo clock TCL (corresponding to the rewound value) from the value of presently progressing time data DUR. Such value "DUR-TCL" is set as the new tempo clock TCL so that the value of tempo clock TCL will be changed identical to the value indicative of the progressing position in the forward direction of tune in a step 554. Thereafter, the execution of this routine will be ended in a step 555. Thus, the submode of automatic performance apparatus is returned to the normal mode, and the reading speed of performance data is also changed to its original speed. Incidentally, the judging process of step 551 corresponds to that of step 501 (shown in FIG. 9). Therefore, this judging process neglects the operation of REW switch 14 in the stop mode (i.e., MODE=0), record mode (i.e., MODE=3) and record standby mode (i.e., MODE=4**).

Next, description will be given with respect to the case where the REW switch 14 and function switch 16 are simultaneously depressed. In this case, the judgement result of step 504 (shown in FIG. 9) turns to "YES" so that the value of submode data SUBMOD is set to "2" in a next step 508. Thus, the submode of automatic performance apparatus is set to the jump rewinding mode in which the pointer value PNT is decremented by jumping a certain amount (e.g., maximum 10% of the progressing position of performance). In a step 509, the all-off data are transmitted to the MIDI transmitter 33 so that the generation of musical tone signal will be stopped.

Next, the CPU 41 sets the jump data PC10 in the following formula (7) based on the present tempo clock number NTM and total tempo clock number TTM.

$$PC10 = INT\{(NTM-1)*10/TTM\}*10 \qquad (7)$$

In such formula (7), the first place of the percentage representative of the progressing position of tune which is rewound by the amount of one performance data is cut off, so that the value of jump data PC10 will indicate the progressing position which is rewound by maximum 10% from the progressing position corresponding to the present tempo clock number NTM. For example, when the value of INT(NTM*100/TTM) corresponds to 25%, the value of jump data PC10 corresponds to 20%. On the other hand, when the value of INT(NTM*100/TTM) corresponds to just 30%, the value of jump data PC10 corresponds to 20%. Thereafter, the "count-down routine" (shown in FIGS. 13A and 13B) is executed in a step 511, and the tempo clock TCL is incremented by "1" in a step 512. Then, due to a judging process of step 513, the circulating processes consisting of the steps 511 to 513 are repeatedly executed until the value of display data DSP becomes lower than the value of jump data PC10 so that the judgement result of step 513 will turn to "YES". In the "count-down routine", the pointer value PNT is rewound and the progressing position of automatic performance is displayed as described before.

When the judgement result of step 513 turns to "YES", the execution of this "REW switch on-event routine" is ended in the step 502. Thus, the pointer value PNT is rewound by jumping, so that the progressing position of automatic performance will be decremented by the predetermined amount corresponding to the whole length of the tune.

In such state, when the depression of REW switch 14 is released, the above-mentioned "REW switch off-event routine" (shown in FIG. 10) is executed so that the submode of automatic performance apparatus is reset to the normal mode and the reading speed of performance data is also reset to its original speed.

Meanwhile, at every time when the REW switch 14 and function switch 16 are simultaneously depressed after the depression of REW switch 14 is released, the "REW switch on-event routine" (shown in FIG. 9) is repeatedly executed so that the progressing position of automatic performance is rewound by 10%. By repeatedly executing such processes, the progressing position of automatic performance is rewound by 10%, so that it becomes easy to change the present progressing position to the desirable position.

Incidentally, in the rewinding mode and jump rewinding mode, the generation of musical tone signal is not controlled. As shown in FIG. 16, the play mode and play standby mode will not be also changed.

Figure 12A:
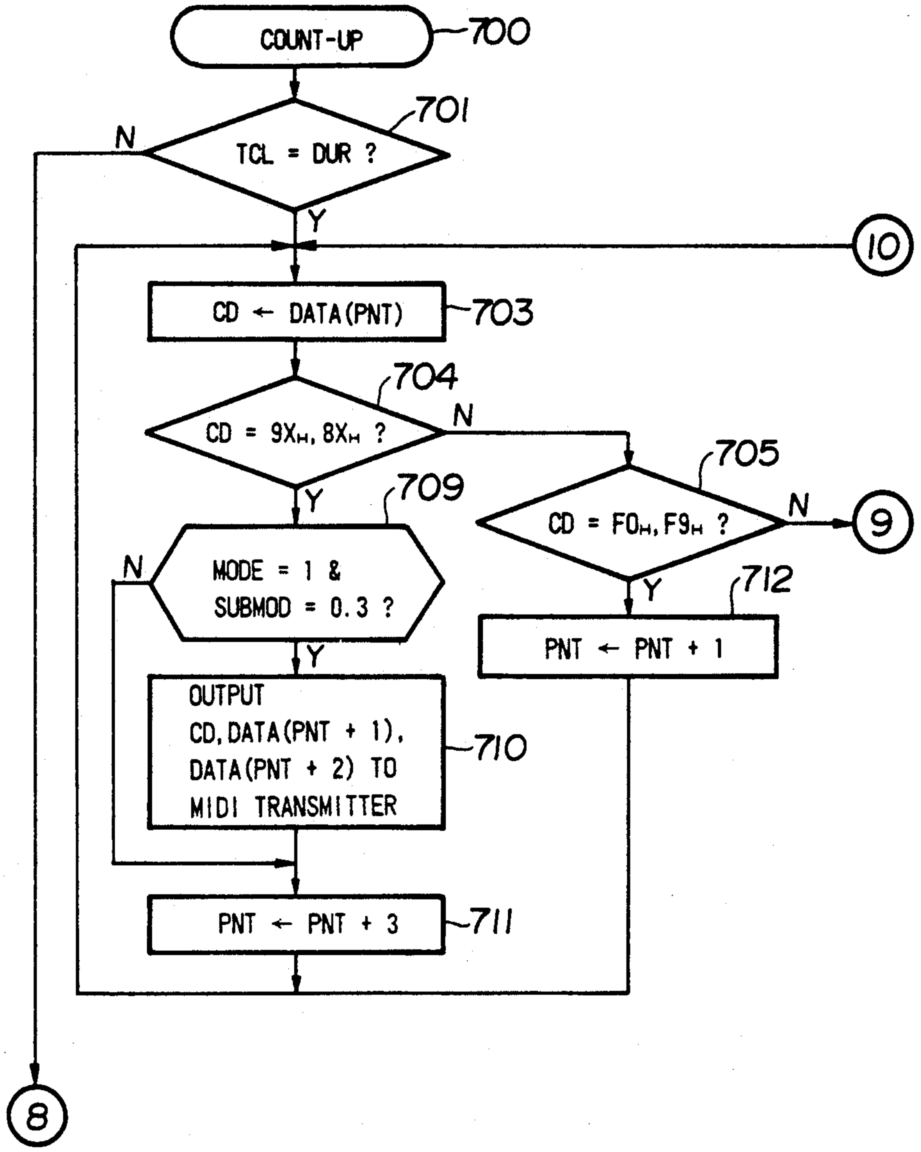
Figure 12B:
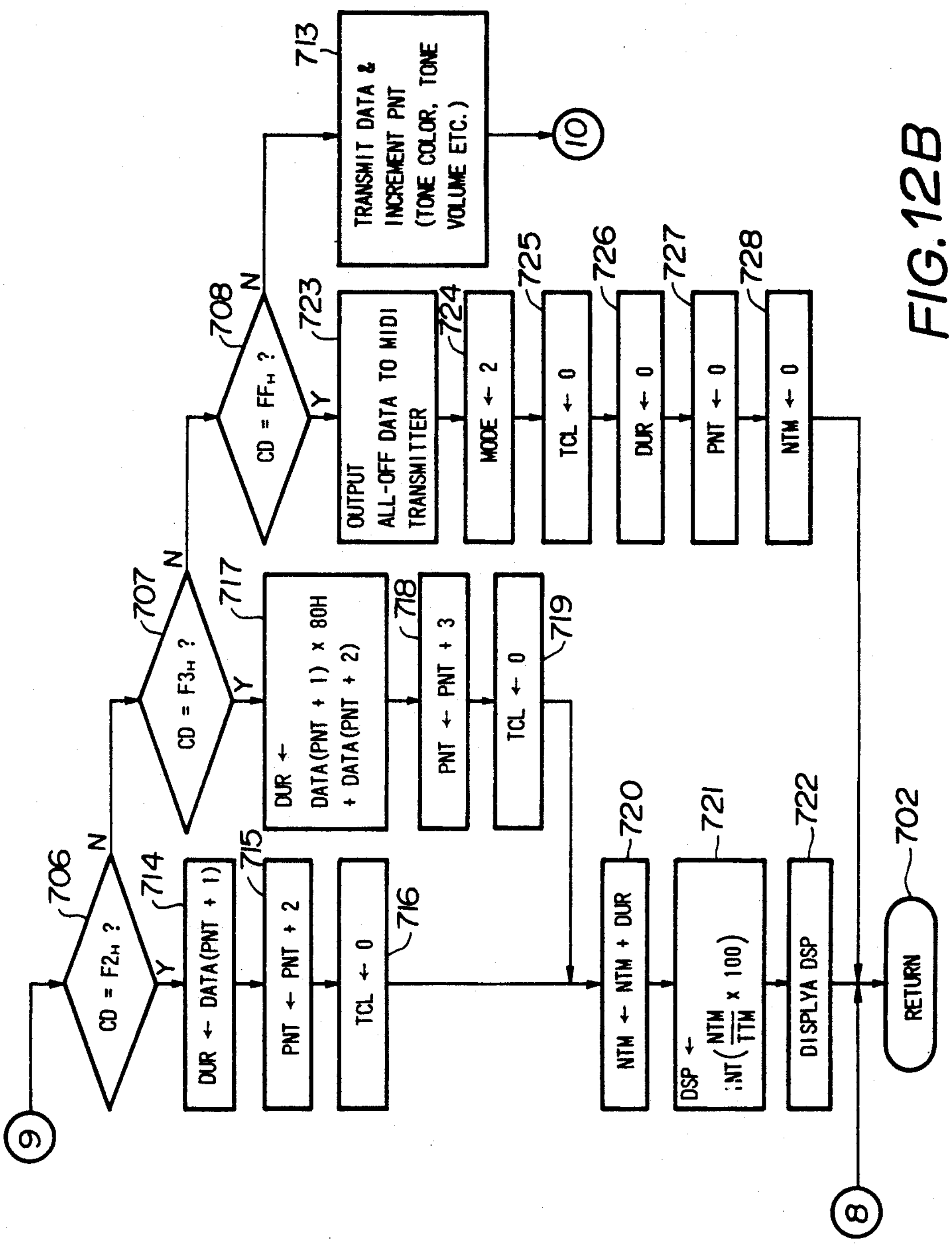

[C] Modified Examples of Embodiment (1) In the play mode, the present tempo clock number NTM representative of the present progressing position of automatic performance is obtained by accumulating the value of time data DUR in the step 720 (shown in FIG. 12B). However, when the tempo clock TCL is incremented by "1" in the step 205 or 419, it is possible to sequentially renew the present tempo clock number NTM by sequentially incrementing the number NTM by "1" with the renewing of tempo clock TCL.

(2) In the present embodiment, in order to calculate the display data DSP indicative of the progressing rate of automatic performance, the total tempo clock number TTM is stored in the working memory 43 in the performance recording. However, before the play mode, it is possible to calculate the total tempo clock number TTM by accumulating all of the values of time data DUR which are stored between the tune start data and tune end data within the performance data memory 50 every time the performance data are started to be read out.

(3) In the present embodiment, the display data DSP indicative of the progressing rate of automatic performance are determined based on the present tempo clock number NTM and total tempo clock number TTM. However, it is possible to calculate this progressing rate based on the pointer value PNT and the value of address of memory 50 at which the tune end data are stored. In such case, before the performance data are started to be read out in the play mode, the CPU 41 searches each performance data stored in the memory 50 to thereby store the storing address value of tune end data in the working memory 43. In the reading of performance data, the pointer value PNT is subtracted by such storing address value so that the progressing rate is calculated out. In addition, at the end of recording mode of performance data, it is possible to use such storing address value for the calculation of progressing rate. These modified examples are inaccurate in the calculation of progressing rate as compared to the present embodiment described before. However, the constitution of these modified examples can be simplified because of the usage of pointer value PNT instead of the accumulation of present tempo clock number NTM.

(4) The display unit 18 displays the progressing position of automatic performance by the digits. Instead of the display unit 18, it is possible to use the lamps which are linearly disposed in one line or plural lines, the lamps which are disposed in circle or the band-shaped indicator. In such case, the progressing position and its rate can be continuously displayed based on the number or color of lighted lamps and the like.

(5) In the present embodiment, the period of tempo clock signal generated from the tempo oscillator 31 in the FF mode or REW mode is set to certain period (e.g., 5 or 10 milliseconds). However, it is possible to set this period in response to the value of tempo data TMP which is set by the tempo controller 17.

(6) In the present embodiment, the tempo of automatic performance apparatus is changed by changing the value of tempo data TMP and period of tempo clock signal in the FF mode or REW mode. However, it is possible to change the value of time data DUR by multiplying some coefficients thereto.

(7) In the present embodiment, the performance data of one tune are only stored in the memory 50. However, it is possible to store the performance data of plural tunes in the memory 50 by dividing the storage area of the memory 50. In addition, it is possible to provide an external memory unit using a magnetic disk, magnetic tape, optical disk or the like. In this case, the performance data are transmitted between the performance data memory 50 and the external memory unit. In such case, it is necessary to store the total tempo clock number TTM and performance data together in the external memory unit. Further, it is possible to use this external memory unit instead of the performance data memory 50.

(8) In the present embodiment, the jumping amount in the jump mode and jump rewinding mode is set to 10%. However, it is possible to set such jumping amount to other percentages such as 5% and 20%. In addition, it is possible to arbitrarily set such jumping amount from an external device.

(9) The above jumping amount is set in response to the total time which must be required in the normal reading of performance data. However, it is possible to set this jumping amount in response to the address number, the number of performance data and the like.

(10) The reading position of performance data memory 50 is jumped every time the FF switch 13 and function switch 16 are simultaneously depressed or every time the REW switch 14 and function switch 16 are simultaneously depressed. However, it is possible to sequentially execute the jumping operation after a certain period has passed while the switches 13 and 16 (or 14 and 16) are simultaneously and continuously depressed.

(11) In the jumping operation, the jump data PC10 indicative of the destination of pointer PNT are set and then the pointer PNT is advanced with high speed until the value of display data DSP reaches the value of jump data PC10. However, it is possible to employ another method in which the value of time data DUR is started to be accumulated from the value "0" just after the switches 13 and 16 (or 14 and 16) are simultaneously depressed; and the high-speed incrementing or decrementing of the pointer value PNT is stopped when the accumulation result becomes identical to 10%.

(12) In the present embodiment, the FF mode is executed when the FF switch 13 is only operated; the jump mode is executed when the switches 13 and 16 are simultaneously operated; the REW mode is executed when the REW switch 14 is only operated; and the jump REW mode is executed when the switches 14 and 16 are simultaneously operated. However, it is possible to further provide the mode switches respectively corresponding to these four modes. In such case, the pointer value PNT is sequentially renewed by high speed while the mode switches corresponding to the FF mode and REW modes are operated. In addition, the pointer value PNT is jumped when the mode switches corresponding to the jump mode and jump REW mode are operated.

Above is the description of a preferred embodiment and its modified examples. This invention may be practiced or embodied in still other ways without departing from the spirit or essential character thereof as described heretofore. Therefore, the preferred embodiment described herein is illustrative and not restrictive, the scope of the invention being indicated by the appended claims, and all variations which come within the meaning of the claims are intended be be embraced therein.

What is claimed is:

1. An automatic performance apparatus comprising:

(a) memory means for storing performance data in a sequence corresponding to the progression of a musical tune, said performance data concerning performance of a musical instrument;

(b) reading means for generating an address signal by which addresses in said memory means are sequentially designated and for sequentially reading said performance data from said addresses, said address signal having an address value which is incremented at a speed corresponding to a predetermined tempo;

(c) at least one manually operable member; and (d) jump control means for controlling said reading means in response to operation of said manually operable member so that said address value is jumped by a predetermined jump amount in a progressing direction or a reverse direction of the performance of said musical instrument by every operation of said manually operable member, wherein said predetermined jump amount corresponds to a fixed time ratio, said time ratio employing the total time which is necessary for reading all of said performance data from said memory means.

2. An automatic performance apparatus according to claim 1, wherein said jump control means further comprises:

(a) measuring means for continuously measuring a first time ratio between an elapsed time which has passed while said reading means reads out said performance data and a total time, said total time being the time necessary to read all of said performance data from said memory means;

(b) setting means for setting a target time ratio indicating an elapsed time which is shifted by a predetermined second time ratio from said first measured time ratio in response to the operation of said manually operable member; and (c) means for incrementing or decrementing said address value at high speed in the progressing direction or the reverse direction of said tune, respectively, until the measured first time ratio becomes identical to said target time ratio.

3. An automatic performance apparatus comprising:

(a) memory means for storing performance data in a sequence corresponding to the progression of a musical tune, said performance data concerning performance of a musical instrument;

(b) reading means for generating an address signal by which addresses in said memory means are sequentially designated and for sequentially reading said performance data from said addresses, said address signal having an address value which is incremented at an incrementing speed corresponding to a predetermined tempo;

(c) first and second manually operable members;

(d) speed control means for controlling said reading means in response to operation of said first manually operable member to thereby increase the incrementing speed of said address value during the operation of said first manually operable member;

(e) measuring means for measuring the elapsed time of the progressing tune when said reading means reads out said performance data;

(f) ratio computing means for computing a time ratio between the measured elapsed time and the whole time period which is necessary for reading all of said performance data from said memory means;

(g) display means for displaying said time ratio computed by said ratio computing means; and (h) jump control means for controlling said reading means in response to simultaneous operation of said first and second manually operable members during an automatic performance so that said address value is jumped to a position related to the time ratio by a corresponding predetermined jump amount in a progressing direction of said tune every time said first and second manually operable members are simultaneously operated.

4. An automatic performance apparatus comprising:

(a) memory means for storing performance data in a sequence corresponding to the progression of a musical tune, said performance data concerning performance of a musical instrument;

(b) reading means for generating an address signal by which addresses in said memory means are sequentially designated and for sequentially reading said performance data from said addresses, said address signal having an address value which is incremented or decremented at a speed corresponding to a predetermined tempo;

(c) first and second manually operable members;

(d) means for controlling said reading means in response to operation of said first manually operable member to thereby increase the decrementing speed of said address value during the operation of said first manually operable member, said means for controlling decrementing said address value in a direction reverse to a progressing direction of said tune;

(e) measuring means for measuring the elapsed time of the progressing tune when said reading means reads out said performance data;

(f) ratio computing means for computing a time ratio between the measured elapsed time and the whole time period which is necessary for reading all of said performance data from said memory means;

(g) display means for displaying said time ratio computed by said ratio computing means; and (h) jump control means for controlling said reading means in response to simultaneous operation of said first and second manually operable members during an automatic performance so that said address value is jumped to a position related to the time ratio by a corresponding predetermined jump amount in said direction reverse to said progressing direction of said tune every time said first and second manually operable members are simultaneously operated.

* * * * *